US012223639B2

(12) United States Patent
Takada et al.

(10) Patent No.: US 12,223,639 B2
(45) Date of Patent: Feb. 11, 2025

(54) PHOTOGRAPHING GUIDE DEVICE

(71) Applicant: NEC Corporation, Tokyo (JP)

(72) Inventors: Jun Takada, Tokyo (JP); Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 762 days.

(21) Appl. No.: 17/417,218

(22) PCT Filed: Dec. 10, 2019

(86) PCT No.: PCT/JP2019/048300
§ 371 (c)(1),
(2) Date: Jun. 22, 2021

(87) PCT Pub. No.: WO2020/145004
PCT Pub. Date: Jul. 16, 2020

(65) Prior Publication Data
US 2022/0076399 A1 Mar. 10, 2022

(30) Foreign Application Priority Data

Jan. 10, 2019 (JP) ................................ 2019-002501

(51) Int. Cl.
*G06T 7/50* (2017.01)
*G06F 18/22* (2023.01)
*G06T 7/00* (2017.01)
*G06T 7/30* (2017.01)
*G06T 7/70* (2017.01)

(52) U.S. Cl.
CPC ............. *G06T 7/001* (2013.01); *G06F 18/22* (2023.01); *G06T 7/30* (2017.01); *G06T 7/50* (2017.01);

(Continued)

(58) Field of Classification Search
CPC .. G06T 7/001; G06T 7/30; G06T 7/50; G06T 7/70; G06T 2207/30184;
(Continued)

(56) References Cited

U.S. PATENT DOCUMENTS 9,418,428 B2 * 8/2016 Saito ...................... H04N 7/188
2005/0111738 A1 * 5/2005 Iizuka ................... G06F 18/213
382/280

(Continued)

FOREIGN PATENT DOCUMENTS

JP 2003194757 A 7/2003
JP 2006162477 A 6/2006
(Continued)

OTHER PUBLICATIONS

International Search Report for PCT Application No. PCT/JP2019/048300, mailed on Mar. 17, 2020.

*Primary Examiner* — Sheela C Chawan

(57) ABSTRACT

A photographing guide device includes a detection means and an output means. The detection means compares a candidate image of a structure captured from a capturing candidate position in a capturing candidate direction with a registered image of the structure captured from a given capturing position in a given capturing direction and stored in advance, thereby detecting a positional difference between the capturing candidate position and the given capturing position. The output means outputs information indicating the detected positional difference.

9 Claims, 24 Drawing Sheets

(52) U.S. Cl.
CPC ...... *G06T 7/70* (2017.01); *G06T 2207/30184* (2013.01)

(58) Field of Classification Search
CPC ........... G06T 2207/10016; G06T 7/337; G06T 7/521; G06T 7/593; G06T 7/0002; G06T 7/579; G06T 7/74; G06F 18/22; G06V 10/247; G01H 17/00; G01M 99/00; G01N 21/88
USPC .......................................................... 382/103
See application file for complete search history.

(56) References Cited

U.S. PATENT DOCUMENTS

| | | |
|---|---|---|
| 2015/0117752 A1 | 4/2015 | Ueno et al. |
| 2017/0128737 A1 | 5/2017 | Yasumuro et al. |
| 2017/0308088 A1* | 10/2017 | Sabe .................... G05D 1/0094 |
| 2018/0220083 A1* | 8/2018 | Jones .................... G06T 7/0012 |
| 2018/0302553 A1 | 10/2018 | Weng et al. |
| 2019/0355148 A1 | 11/2019 | Horita |

FOREIGN PATENT DOCUMENTS

| | | |
|---|---|---|
| JP | 2011223250 A | 11/2011 |
| JP | 2012156640 A | 8/2012 |
| JP | 2013074376 A | 4/2013 |
| JP | 2015082830 A | 4/2015 |
| JP | 2015159469 A | 9/2015 |
| JP | 6379475 B2 | 8/2018 |
| WO | 2015098155 A1 | 7/2015 |
| WO | 2018143263 A1 | 8/2018 |

\* cited by examiner

FIG. 3

11661 DIAGNOSED PART INFORMATION

| DIAGNOSED PART ID | REGISTRATION DATE/TIME | REGISTERED CAPTURING POSITION | REGISTERED CAPTURING DIRECTION | REGISTERED CAPTURED IMAGE |
|---|---|---|---|---|
| 11662 | 11663 | 11664 | 11665 | 11666 |

FIG. 4

11671 DIAGNOSIS RESULT
INFORMATION

| DIAGNOSED PART ID | DIAGNOSIS DATE/TIME | DIAGNOSIS RESULT |
|---|---|---|
| 11672 | 11673 | 11674 |

FIG. 16

21661 DIAGNOSED PART INFORMATION

| DIAGNOSED PART ID | REGISTRATION DATE/TIME | REGISTERED CAPTURING POSITION | REGISTERED CAPTURING DIRECTION | REGISTERED CAPTURED IMAGE | REGISTERED CRACK IMAGE |
|---|---|---|---|---|---|
| 21662 | 21663 | 21664 | 21665 | 21666 | 21667 |

FIG. 17
NA 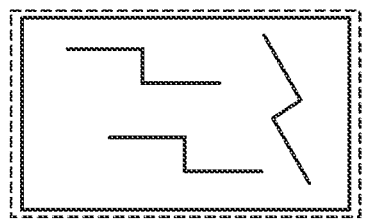
NB 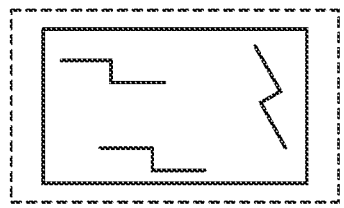
NC 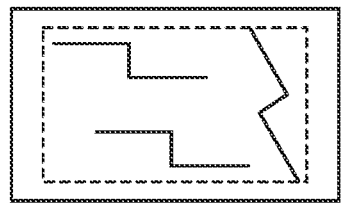
ND 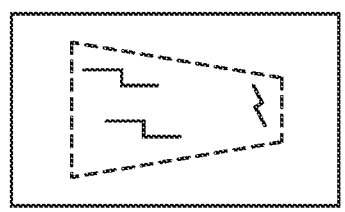
NE 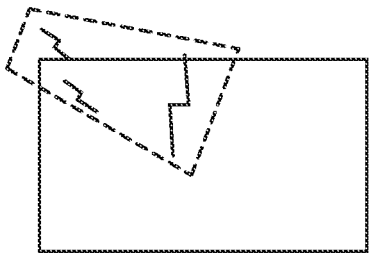

FIG. 21

31661 DIAGNOSED PART INFORMATION

| DIAGNOSED PART ID | REGISTRATION DATE/TIME | REGISTERED CAPTURING POSITION | REGISTERED CAPTURING DIRECTION | REGISTERED CAPTURED IMAGE | REGISTERED CRACK IMAGE | REGISTERED THREE-DIMENSIONAL SHAPE |
|---|---|---|---|---|---|---|
| 31662 | 31663 | 31664 | 31665 | 31666 | 31667 | 31668 |

PHOTOGRAPHING GUIDE DEVICE

This application is a National Stage Entry of PCT/JP2019/048300 filed on Dec. 10, 2019, which claims priority from Japanese Patent Application 2019-002501 filed on Jan. 10, 2019, the contents of all of which are incorporated herein by reference, in their entirety.

TECHNICAL FIELD

The present invention relates to a photographing guide device, a photographing guide method, and a storage medium.

BACKGROUND ART

Various technologies have been proposed for analyzing an image of a structure such as a bridge captured by an imaging device and diagnosing the soundness of the structure (for example, Patent Literatures 1 and 2).

Further, Patent Literature 3 proposes a diagnosis device that allows the position of a previously measured point to be identified promptly, accurately, and easily. Specifically, the diagnosis device includes a GPS receiver that detects a position to be measured and inputs it to a computer. Further, the diagnosis device stores measurement position information, measurement data, measurement conditions, and the like in a database, and unitarily manages them. The diagnosis device also searches the database for the past measurement point information within a given range around the current position measured by the GPS receiver and displays it, to thereby support the work of identifying the previous measurement position by the measurer.

Patent Literature 1: JP 2006-162477 A
Patent Literature 2: JP 6379475 B
Patent Literature 3: JP 2003-194757 A
Patent Literature 4: JP 2015-159469 A1

SUMMARY

It is generally difficult to give long-term weather resistance to a measuring device group such as a camera. Moreover, there is a case where the same measuring device group must be used commonly for inspection and diagnosis of a plurality of structures for cost reduction. Therefore, there is a case where a measuring device group cannot be provided permanently to a structure such as a bridge. In such a situation, an operator brings a measuring device group to the vicinity of a structure to be diagnosed and performs measurement once in several months. In that case, in order to diagnose deterioration caused by aging with high accuracy, it is necessary to photograph the same part of the structure from the same capturing position every time. However, the position measured by the GPS includes a margin of error. Moreover, in the vicinity of a structure such as a bridge, the accuracy of the GPS deteriorates. Therefore, it is difficult to photograph a structure from the same capturing position every time.

An object of the present invention is to provide a photographing guide device that solves the above-described problem.

A photographing guide device according to one aspect of the present invention includes a detection means for comparing a candidate image of a structure captured from a capturing candidate position in a capturing candidate direction with a registered image of the structure captured from a given capturing position in a given capturing direction and stored in advance, thereby detecting a positional difference between the capturing candidate position and the given capturing position, and an output means for outputting information indicating the positional difference detected.

Further, a photographing guide method according to another aspect of the present invention includes comparing a candidate image of a structure captured from a capturing candidate position in a capturing candidate direction with a registered image of the structure captured from a given capturing position in a given capturing direction and stored in advance, thereby detecting a positional difference between the capturing candidate position and the given capturing position, and outputting information indicating the positional difference detected.

Further, a computer-readable storage medium according to another aspect of the present invention stores a program for causing a computer to execute processing of:

comparing a candidate image of a structure captured from a capturing candidate position in a capturing candidate direction with a registered image of the structure captured from a given capturing position in a given capturing direction and stored in advance, thereby detecting a positional difference between the capturing candidate position and the given capturing position; and outputting information indicating the positional difference detected.

With the configurations described above, the present invention enables photographing of a structure from the same capturing position every time.

BRIEF DESCRIPTION OF DRAWINGS

FIG. 3 illustrates an exemplary format of diagnosed part information stored in a diagnosed part database of the computer in the diagnosis device according to the first exemplary embodiment of the present invention.

FIG. 4 illustrates an exemplary format of diagnosis result information stored in a diagnosis result database of the computer in the diagnosis device according to the first exemplary embodiment of the present invention.

FIG. 16 illustrates an exemplary format of diagnosed part information stored in a diagnosed part database of the computer in the diagnosis device according to the second exemplary embodiment of the present invention.

FIG. 17 illustrates some examples of synthetic images included in a crack image matching result in the case of matching success of the computer in the diagnosis device according to the second exemplary embodiment of the present invention.

FIG. 21 illustrates an exemplary format of diagnosed part information stored in a diagnosed part database of the computer in the diagnosis device according to the third exemplary embodiment of the present invention.

EXEMPLARY EMBODIMENTS

Next, exemplary embodiments of the present invention will be described with reference to the drawings.

First Exemplary Embodiment

Figure 1:
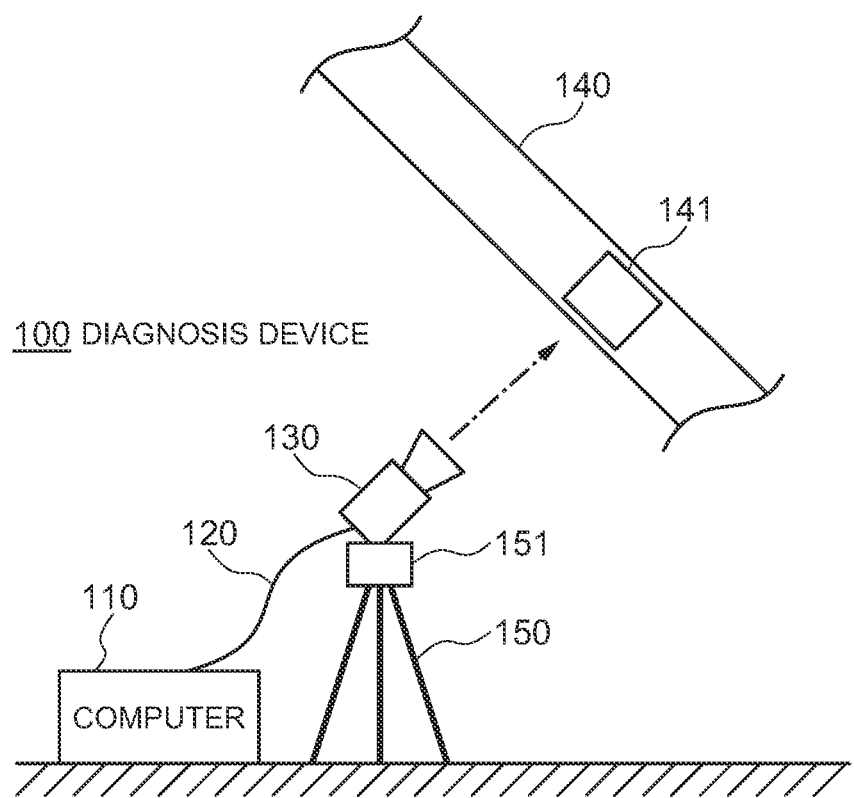
FIG. 1 is a block diagram illustrating an exemplary configuration of a diagnosis device according to a first exemplary embodiment of the present invention.

FIG. 1 is a block diagram illustrating an exemplary configuration of a diagnosis device 100 according to a first exemplary embodiment of the present invention. Referring to FIG. 1, the diagnosis device 100 includes a computer 110 and a camera 130 connected thereto via a cable 120.

The camera 130 is an imaging device that captures images of a partial area 141 existing on a surface of a structure 140 that is a diagnosis object, at a predetermined frame rate. The structure 140 is a bridge, for example. The partial area 141 is a part to be diagnosed of a main girder or a bridge pier of a bridge, for example. The size of the partial area 141 ranges from several tens centimeters to several meters square, for example. The camera 130 is attached to a platform 151 on a tripod 150 so as to allow the capturing direction of the camera to be fixed in any direction. The camera 130 may be a high-speed camera equipped with a charge-coupled device (CCD) image sensor or a complementary MOS (CMOS) image sensor having a pixel capacity of about several thousands pixels. Further, the camera 130 may be a visible light and black and white camera, or may be an infrared camera or a color camera. The camera 130 has a GPS receiver for measuring the position of the camera. The camera 130 also has an azimuth sensor and an acceleration sensor for measuring the capturing direction of the camera.

The computer 110 has a diagnosis function of fetching an image of the structure 140 captured by the camera 130, performing predetermined image processing and determining the soundness of the structure 140, and outputting the determination result. The computer 110 also has a guide function of assisting an operator so as to be able to photograph the same partial area 141 of the structure 140 from the same capturing position every time, when performing diagnosis in a predetermined cycle such as once in several months.

Figure 2:
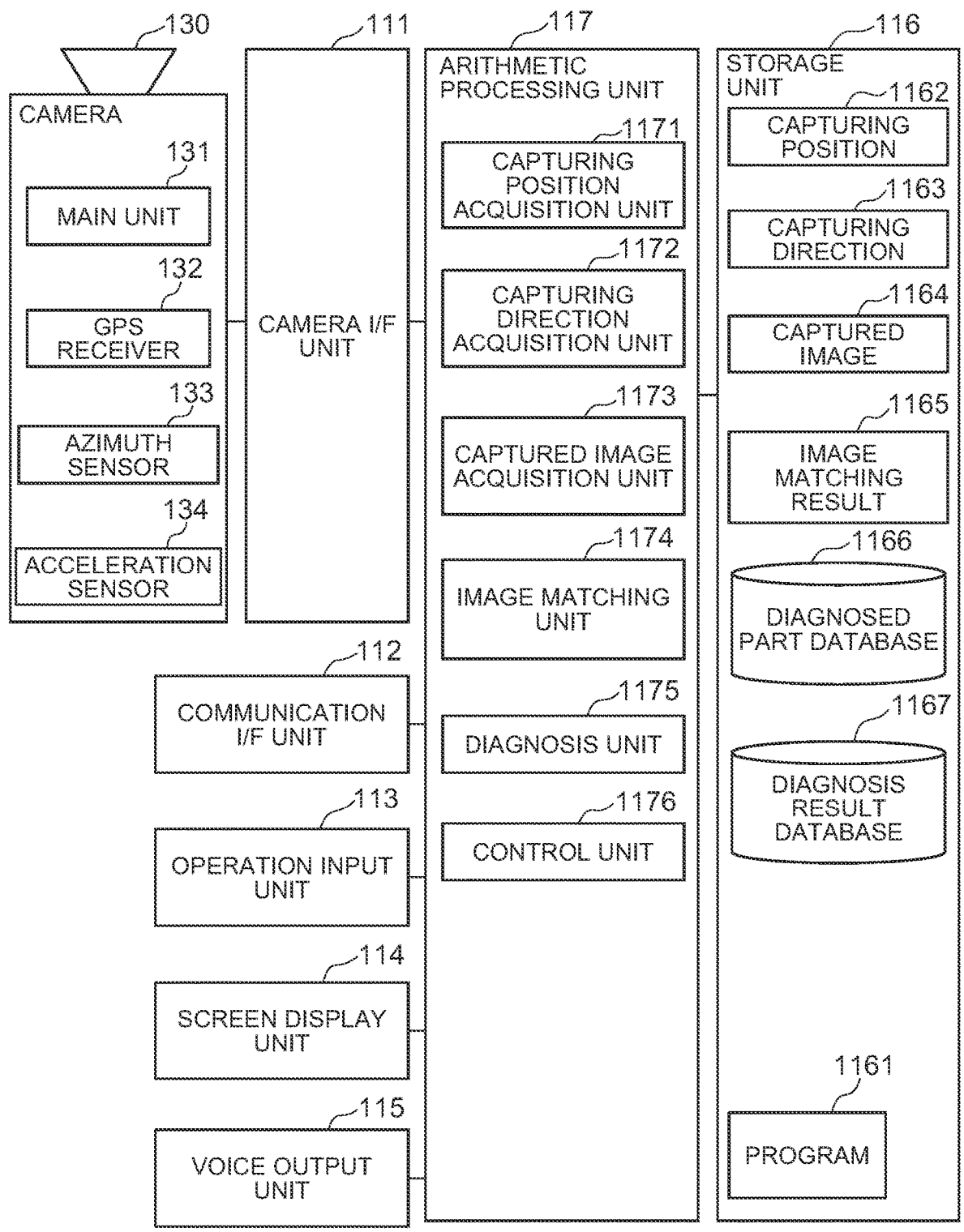
FIG. 2 is a block diagram illustrating an exemplary configuration of a computer in the diagnosis device according to the first exemplary embodiment of the present invention.

FIG. 2 is a block diagram illustrating an exemplary configuration of the computer 110. Referring to FIG. 2, the computer 110 includes a camera interface (I/F) unit 111, a communication I/F unit 112, an operation input unit 113, a screen display unit 114, a voice output unit 115, a storage unit 116, and an arithmetic processing unit 117.

The camera I/F unit 111 is connected to the camera 130 via a cable 120, and is configured to perform data transmission and reception between the camera 130 and the arithmetic processing unit 117. The camera 130 has a main unit 131 including an image sensor, an optical system, and the like, and the GPS receiver 132, the azimuth sensor 133, and the acceleration sensor 134 described above. The camera I/F unit 111 is configured to perform data transmission and reception between the main unit 131, the GPS receiver 132, the azimuth sensor 133, and the acceleration sensor 134, and the arithmetic processing unit 117.

The communication I/F unit 112 is configured of a data communication circuit, and is configured to perform data communication with an external device, not shown, connected via wired or wireless communication. The operation input unit 113 is configured of operation input devices such as a keyboard and a mouse, and is configured to detect operation by an operator and output it to the arithmetic processing unit 117. The screen display unit 114 is configured of a screen display device such as a liquid crystal display (LCD), and is configured to display, on a screen, various types of information such as a menu screen according to an instruction from the arithmetic processing unit 117. The voice output unit 115 is configured of a sound output device such as a loudspeaker, and is configured to output various types of voices such as a guide message according to an instruction from the arithmetic processing unit 117.

The storage unit 116 is configured of storage devices such as a hard disk and a memory, and is configured to store therein processing information and a program 1161 necessary for various types of processing in the arithmetic processing unit 117. The program 1161 is a program for implementing various processing units by being read and executed by the arithmetic processing unit 117, and is read in advance from an external device or a storage medium via a data input-output function of the communication I/F unit 112 and is stored in the storage unit 116. Main processing information to be stored in the storage unit 116 includes a capturing position 1162, a capturing direction 1163, a captured image 1164, an image matching result 1165, a diagnosed part database 1166, and a diagnosis result database 1167.

The capturing position 1162 is data including longitude, latitude, and height representing the position of a camera measured by the GPS receiver 132, and the clock time.

The capturing direction 1163 is data representing the capturing direction of the camera 130 calculated on the basis of data measured by the azimuth sensor 133 and the acceleration sensor 134 provided to the camera 130. The capturing direction 1163 is configured of three angles of pitch, roll, and yaw representing the posture of the camera 130.

The captured image 1164 is an image captured by the camera 130. The captured image 1164 may be a frame image constituting a video of the partial area 141 of the structure 140 captured by the camera 130.

The image matching result 1165 is data representing a matching result between the captured image 1164 and an image (registered image) stored in the diagnosed part database 1166.

The diagnosed part database 1166 is a storage unit in which information related to the past diagnosed parts is stored. FIG. 3 illustrates an exemplary format of diagnosed part information 11661 stored in the diagnosed part database 1166. The diagnosed part information 11661 of this example is configured of a diagnosed part ID 11662, registration date/time 11663, a registered capturing position 11664, a registered capturing direction 11665, and a registered captured image 11666.

The diagnosed part ID 11662 is identification information for uniquely identifying the diagnosed part. The registration date/time 11663 is date and time when the diagnosed part information 11661 was registered. The registered capturing position 11664 includes latitude, longitude, and height representing the position of the camera 130 when diagnosis was performed. The registered capturing direction 11665 includes three angles of pitch, roll, and yaw representing the posture of the camera 130 when diagnosis was performed. The registered captured image 11666 is an image of the partial area 141 of the structure 140, captured by the camera 130 from the registered capturing position 11664 in the registered capturing direction 11665.

The diagnosis result database 1167 is a storage unit in which information related to diagnosis results is stored. FIG. 4 illustrates an exemplary format of diagnosis result information 11671 stored in the diagnosis result database 1167. The diagnosis result information 11671 of this example is configured of a diagnosed part ID 11672, diagnosis date/time 11673, and a diagnosis result 11674. The diagnosed part ID 11672 is identification information for uniquely identifying the diagnosed part. The diagnosis date/time 11673 is date and time when diagnosis was performed. The diagnosis result 11674 is information representing the result of diagnosis.

The arithmetic processing unit 117 has a processor such as MPU and the peripheral circuits, and is configured to read and execute the program 1161 from the storage unit 116 to allow the hardware and the program 1161 to cooperate with each other to thereby implement the various processing units. The main processing units implemented by the arithmetic processing unit 117 includes a capturing position acquisition unit 1171, a capturing direction acquisition unit 1172, a captured image acquisition unit 1173, an image matching unit 1174, a diagnosis unit 1175, and a control unit 1176.

The capturing position acquisition unit 1171 is configured to periodically acquire the position of the camera 130 measured by the GPS receiver 132 via the camera I/F unit 111 and the current clock time, and update the capturing position 1162 in the storage unit 116 with the acquired position.

The capturing direction acquisition unit 1172 is configured to periodically acquire the azimuth angle and the acceleration in three directions of length, width, and height measured by the azimuth sensor 133 and the acceleration sensor 134, via the camera I/F unit 111. The capturing direction acquisition unit 1172 is also configured to calculate three angles of pitch, roll, and yaw representing the posture of the camera 130, that is, the capturing direction, from the acquired azimuth angle and the acceleration, and update the capturing direction 1163 in the storage unit 116 with the calculation result.

The captured image acquisition unit 1173 is configured to acquire an image captured by the camera 130 from the main unit 131 via the camera I/F unit 111, and update the captured image 1164 in the storage unit 116 with the acquired image.

The image matching unit 1174 is configured to compare the captured image 1164 with the image (registered image) stored in the diagnosed part database 1166, and detect a positional difference between the position of the camera 130 and the position of the camera 130 when the registered image was captured, and a directional difference between the capturing direction of the camera 130 and the capturing direction of the camera 130 when the registered image was acquired. A specific method of image matching is not particularly limited. For example, any matching method such as a matching method based on image similarity or a matching method by feature point extraction and feature point association may be used. An example of the image matching unit 1174 will be described below.

For example, the image matching unit 1174 performs extraction of feature points, association of feature points, estimation of homography matrix that is a kind of geometric transformation matrix, calculation of differences in position and direction, image conversion based on homography matrix, image synthesis, and output of image matching result, in this order.

That is, first, the image matching unit 1174 extracts a plurality of feature points from a captured image and a registered image using an arbitrary method such as Scale Invariant Feature Transform (SIFT) or Random. Then, the image matching unit 1174 associates a feature point extracted from the captured image with a feature point extracted from a registered image that is similar to the captured image, as a feature point pair. When at least the predetermined number of feature point pairs are not obtained, the image matching unit 1174 determines that matching has failed, and stores the image matching result 1165 indicating a matching failure in the storage unit 116 and ends the processing. When at least the predetermined number of feature point pairs are obtained, the image matching unit 1174 calculates a homography matrix between the captured image and the registered image on the basis of the feature point pairs associated with each other.

Then, the image matching unit 1174 detects a difference between the position of the camera 130 and the registered capturing position, and a difference between the capturing direction of the camera 130 and the registered capturing direction, from the homography matrix. In general, a homography matrix G can be expressed as follows:

$$G=dR+tn^T \qquad (1)$$

In Expression 1, R represents a rotation matrix that can be calculated from three rotation angles about the x axis, the y axis, and the z axis, n represents a normal vector of a plane of the partial area 141, t represents a relative distance vector between the camera 130 and the camera when the registered captured image was captured, and d represents a distance from the camera to the plane of the partial area 141. Since the homography matrix G has been estimated, d, R, t, and n can be obtained from Expression 1. The image matching unit 1174 detects t obtained from Expression 1 as a difference between the position of the camera 130 and the position of the registered capturing position. The image matching unit 1174 also detects the three rotation angles of the rotation matrix R obtained from Expression 1 as a difference between the capturing direction of the camera 130 and the registered capturing direction.

Next, the image matching unit 1174 transforms the registered captured image on the basis of the homography matrix G. Then, the image matching unit 1174 synthesizes the registered captured image after being transformed and the captured image 1164. Then, the image matching unit 1174 determines that matching has succeeded, creates the image matching result 1165 indicating the matching success including the synthesized image and the detected differences in the position and direction, and stores it in the storage unit 116.

Figure 5:
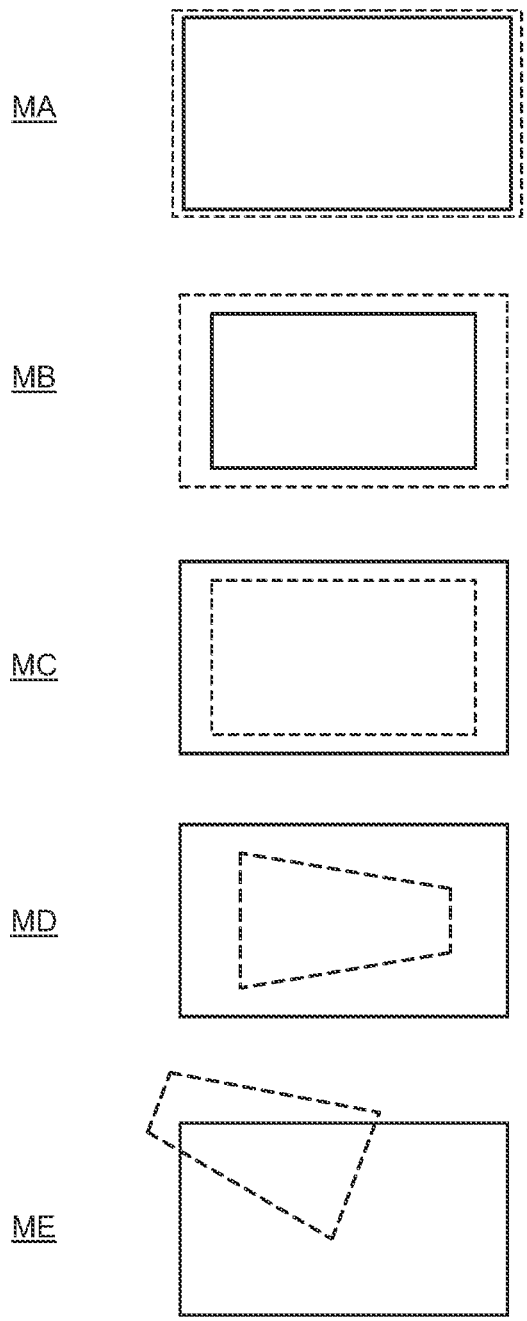
FIG. 5 illustrates some examples of synthetic images included in an image matching result in the case of matching success of the computer in the diagnosis device according to the first exemplary embodiment of the present invention.

FIG. 5 illustrates some examples of synthetic images included in the image matching result 1165 when matching has succeeded. In each of the synthetic images, a solid line shows the captured image 1164 and a broken line shows a registered captured image.

In a synthetic image MA, a registered captured image of the same size is synthesized so as to conform to the entire captured image 1164. Such a synthetic image indicates that the position and the capturing direction of the camera 130 and the position and the capturing direction of the camera 130 at the time of capturing the registered captured image match.

In a synthetic image MB, a registered captured image having a similar shape and a larger size is synthesized with the captured image 1164. Such a synthetic image indicates that the position of the camera 130 is closer to the structure side, compared with the position of the camera 130 at the time of capturing the registered captured image.

In a synthetic image MC, a registered captured image having a similar shape and a smaller size is synthesized with the captured image 1164. Such a synthetic image indicates that the position of the camera 130 is farther from the structure, compared with the position of the camera 130 at the time of capturing the registered captured image.

In a synthetic image MD, a registered captured image in which the right side is shorter than the left side is synthesized with the captured image 1164. Such a synthetic image indicates that the position of the camera 130 is closer to the left side compared with that of the camera 130 at the time of capturing the registered captured image, whereby the capturing direction is close to the right side.

These synthetic images are examples. Depending on the position and the capturing direction of the camera 130, as shown in the synthetic image ME, areas not matched with the registered captured image and the captured image 1164 may be generated in the captured image 1164 and the registered captured image, respectively.

An exemplary configuration of the image matching unit 1174 is as described above.

The diagnosis unit 1175 is configured to diagnose deterioration of the structure 140, on the basis of an image of the structure 140 captured by the camera 130. The method for deterioration diagnosis is not limited particularly. For example, the diagnosis unit 1175 is configured to analyze a video, captured at a high speed by the camera 130, of the partial area 141 of the structure 140 such as a bridge excited by the vehicular traffic or the like and measure the surface vibration, and from the vibration patterns, estimate the internal deterioration conditions such as cracks, exfoliation, and cavitation. The diagnosis unit 1175 is also configured to store information related to the estimated diagnosis result in the diagnosis result database 1167.

The control unit 1176 is configured to mainly control the diagnosis device 100.

Figure 6:
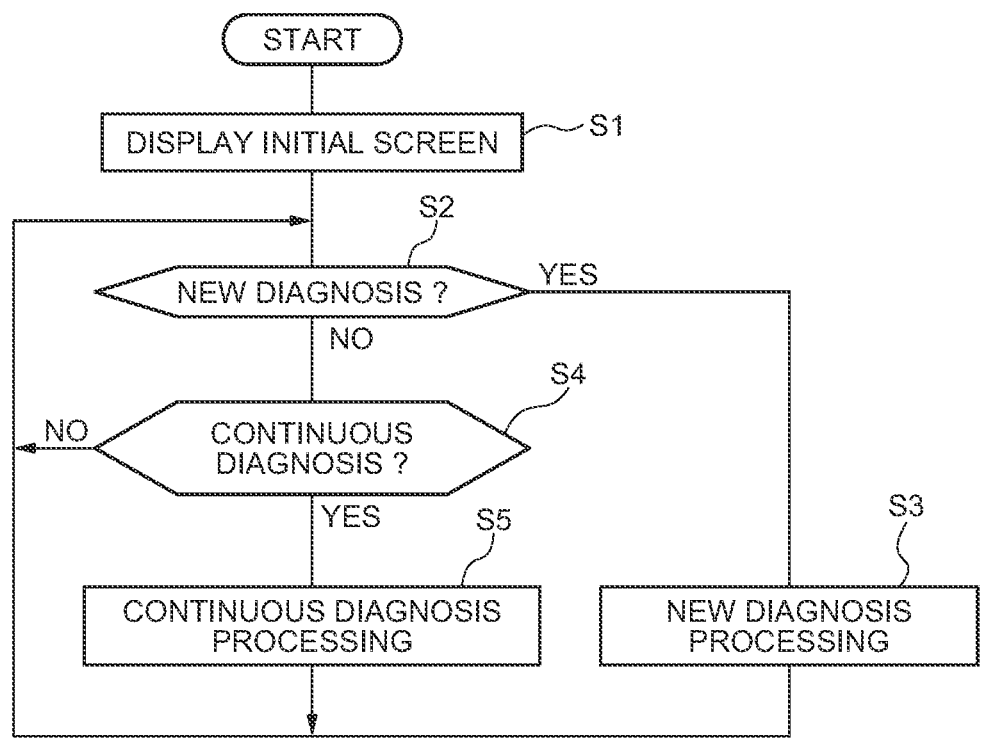
FIG. 6 is a flowchart of an exemplary operation of the diagnosis device according to the first exemplary embodiment of the present invention.

FIG. 6 is a flowchart showing an exemplary operation of the diagnosis device 100. Hereinafter, operation of the diagnosis device 100 when performing deterioration diagnosis of the structure 140 will be described with reference to the drawings.

When an operator installs a measuring device group such as the computer 110 and the camera 130 on site in order to perform deterioration diagnosis of the structure 140 and inputs an activation instruction from the operation unit 113, control by the control unit 1176 is initiated.

Figure 7:
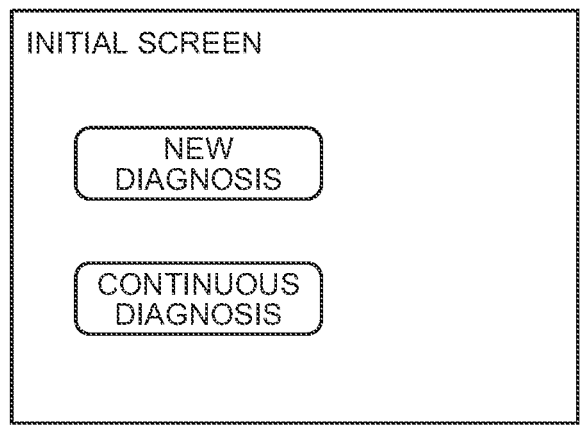
FIG. 7 illustrates an example of an initial screen displayed on a screen display unit of the diagnosis device according to the first exemplary embodiment of the present invention.

First, the control unit 1176 displays an initial screen as illustrated in FIG. 7 on the screen display unit 114 (step S1). On the initial screen, a New Diagnosis button and a Continuous Diagnosis button are shown. The New Diagnosis button is a button for selecting initial diagnosis with respect to the structure 140 set as a new diagnosis object. Meanwhile, the Continuous Diagnosis button is a button for selecting the second or subsequent diagnosis with respect to the same part of the same structure 140. Hereinafter, operation for new diagnosis will be described, and then operation for continuous diagnosis will be described.

<New Diagnosis>

Figure 8:
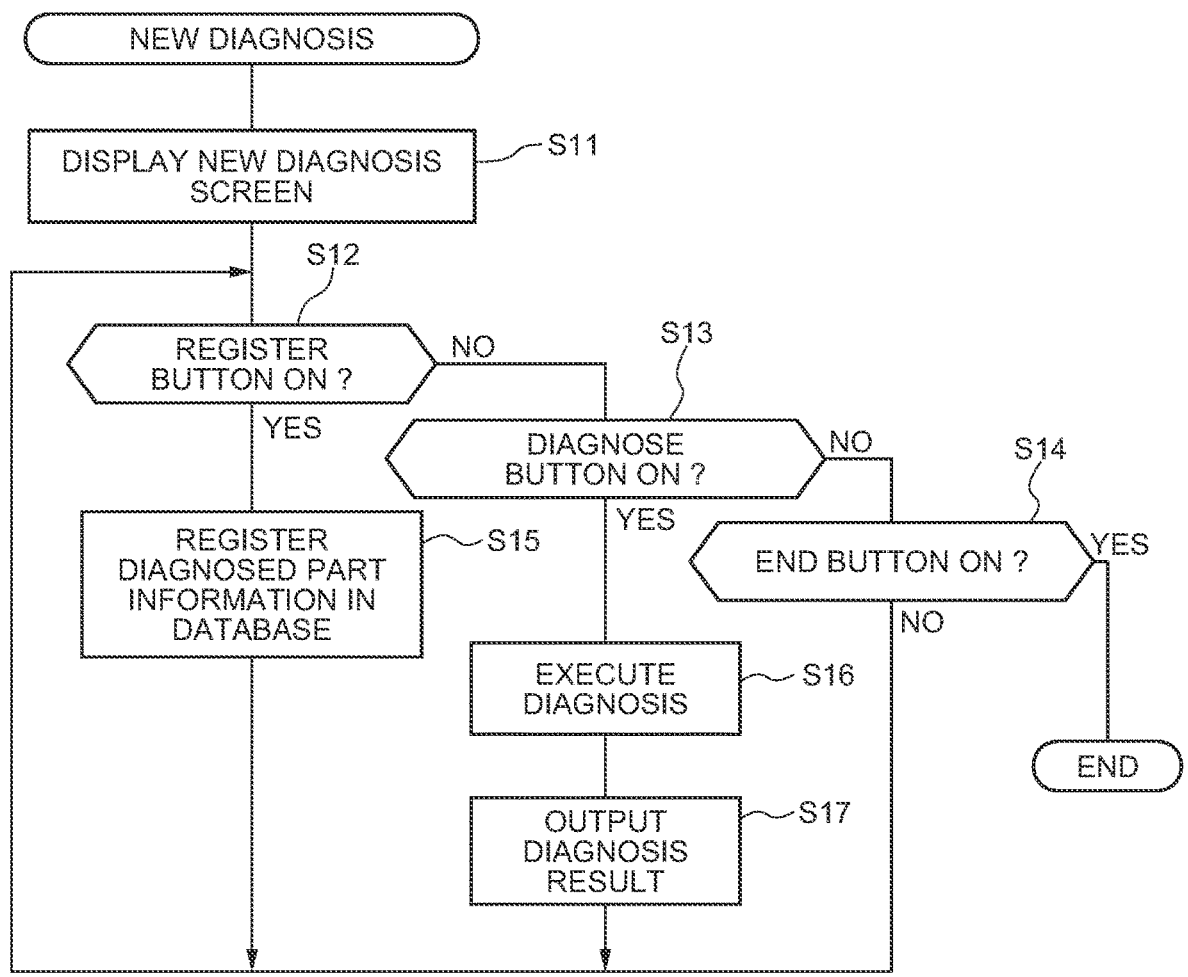
FIG. 8 is a flowchart of an example of new diagnosis processing to be performed by the computer in the diagnosis device according to the first exemplary embodiment of the present invention.

When an operator turns on the New Diagnosis button on the initial screen, the control unit 1176 detects it (step S2), and executes new diagnosis processing (step S3). FIG. 8 is a flowchart showing an example of new diagnosis processing. The control unit 1176 first displays a new diagnosis screen on the screen display unit 114 (step S11).

Figure 9:
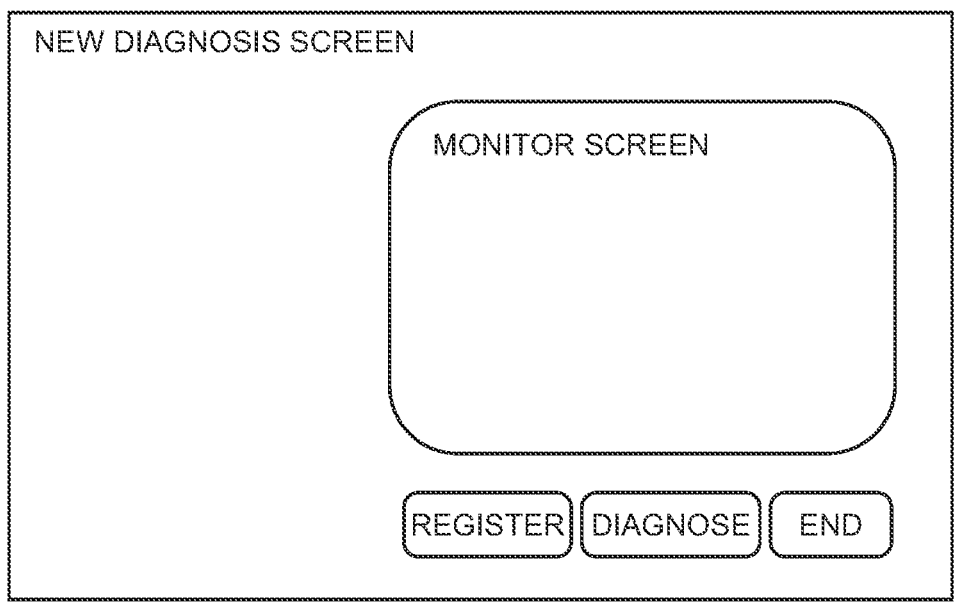
FIG. 9 illustrates an example of a new diagnosis screen displayed on the screen display unit of the diagnosis device according to the first exemplary embodiment of the present invention.

FIG. 9 illustrates an example of a new diagnosis screen. The new diagnosis screen of this example includes a monitor screen for displaying an image being captured by the camera 130, a Register button, a Diagnose button, and an End button. A new image being captured by the camera 130 is acquired from the camera 130 by the captured image acquisition unit 1173, and is stored as the captured image 1164 in the storage unit 116. The control unit 1176 acquires the captured image 1164 from the storage unit 116 and displays it on the monitor screen of the new diagnosis screen. The operator determines the diagnosed part of the structure 140, and sets the determined diagnosed part as the partial area 141. Then, in order to display an image of the partial area 141 in an appropriate size on the monitor screen of the new diagnosis screen, the operator adjusts the installed position of the tripod 150, and adjusts the capturing direction of the camera 130 by the platform 151. In the present embodiment, the angle of view and the magnification of the camera 130 are fixed. Therefore, when the image size of the partial area 141 is small, the operator moves the tripod 150 to a position closer to the structure 140 to thereby expand the image size of the partial area 141. On the contrary, when the image size of the partial area 141 is large, the operator moves the tripod 150 to a position away from the structure 140 to thereby reduce the image size of the partial area 141. Note that it is desirable to capture the partial area 141 from right in front for diagnosis.

Upon completion of adjustment of the position and the capturing direction of the camera 130, to register information of the position and the capturing direction, the operator turns on the Register button. Meanwhile, to perform diagnosis at the adjusted position and capturing direction, the operator turns on the Diagnose button. To end the new diagnosis, the operator turns on the End button. When the control unit 1176 detects that the End button has been turned on (step S14), the processing of FIG. 8 ends.

Meanwhile, when the control unit 1176 detects that the Register button has been turned on (step S12), the control unit 1176 creates new diagnosed part information 11661 and registers it in the diagnosed part database 1166 (step S15). The current position of the camera 130 and the current clock time are acquired from the GPS receiver 132 by the capturing position acquisition unit 1171, and are stored as the capturing position 1162 in the storage unit 116. Further, the capturing position of the camera 130 is calculated by the capturing position acquisition unit 1172 from the azimuth and the acceleration obtained by the azimuth sensor 133 and the acceleration sensor 134, and is stored as the capturing direction 1163 in the storage unit 116. Further, the image being captured by the camera 130 is acquired from the camera 130 by the captured image acquisition unit 1173, and is stored as the captured image 1164 in the storage unit 116. The control unit 1176 acquires the capturing position 1162, the capturing direction 1163, and the captured image 1164 from the storage unit 116, creates the diagnosed part information 11661 on the basis of such information, and registers it in the diagnosed part database 1166. At that time, the control unit 1176 sets a newly adopted ID to the diagnosed part ID 11662 of the diagnosed part information 11661, and sets the current clock time to the registration date/time 11663.

Further, when detecting that the Diagnose button has been turned on (step S13), the control unit 1176 activates the diagnosis unit 1175 and executes diagnosis (step S16). For example, the diagnosis unit 1175 analyzes the video, captured at a high speed by the camera 130, of the partial area 141 of the structure 140 and measures the surface vibration, and from the vibration patterns, estimates the internal deterioration conditions such as cracks, exfoliation, and cavitation, as described above. Then, the diagnosis unit 1175 stores information related to the estimated diagnosis result in the diagnosis result database 1167. The control unit 1176 reads the diagnosis result of the diagnosis unit 1175 from the diagnosis result database 1167, displays it on the screen display unit 114, and/or outputs to an external terminal via the communication I/F unit 112 (step S17).

<Continuous Diagnosis>

Figure 10:
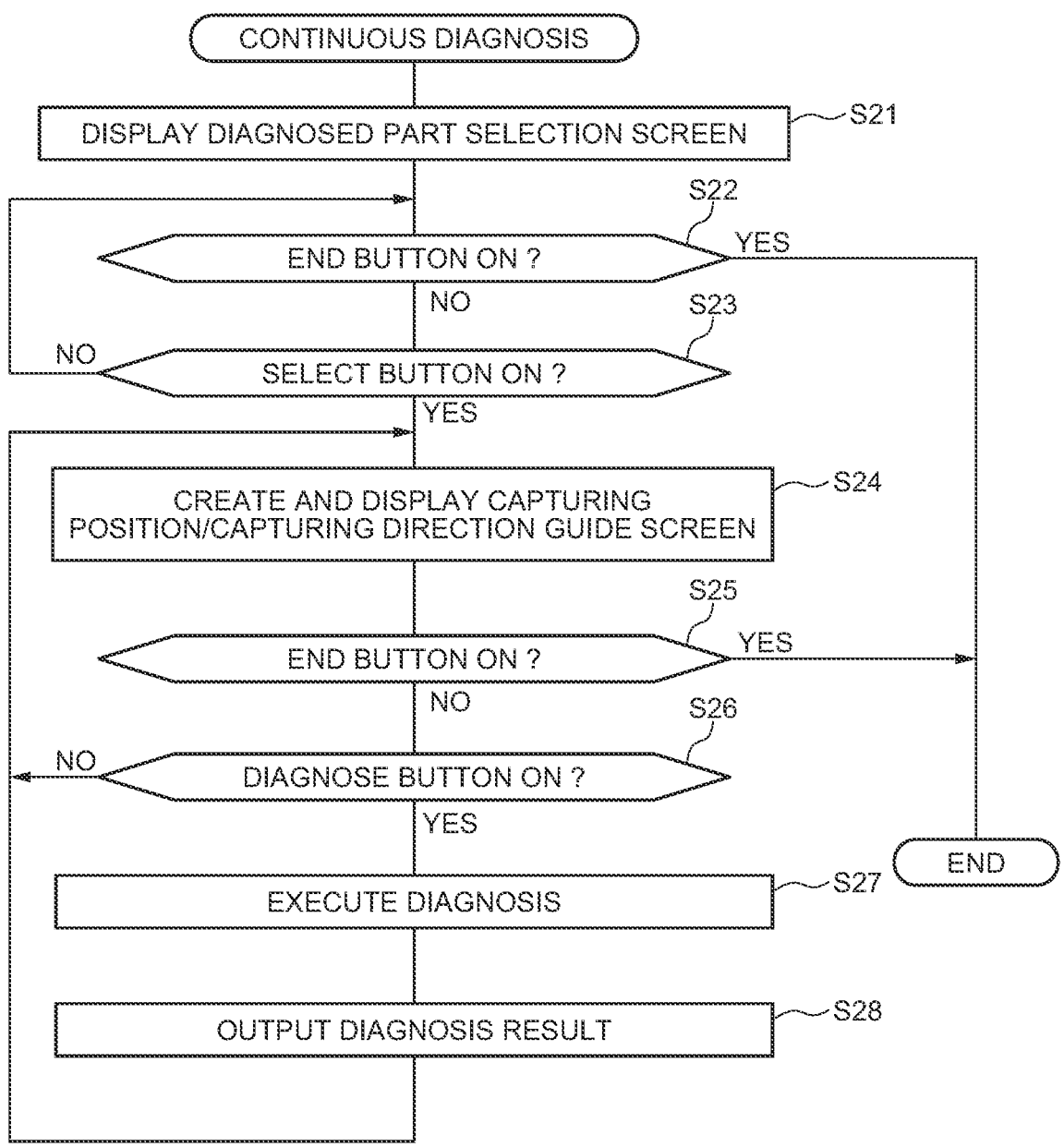
FIG. 10 is a flowchart illustrating an example of continuous diagnosis processing to be performed by the computer in the diagnosis device according to the first exemplary embodiment of the present invention.

When an operator turns on the Continuous Diagnosis button on the initial screen, the control unit 1176 detects it (step S4), and executes continuous diagnosis processing (step S5). FIG. 10 is a flowchart showing an example of continuous diagnosis processing. The control unit 1176 first displays a diagnosed part selection screen on the screen display unit 114 (step S21).

Figure 11:
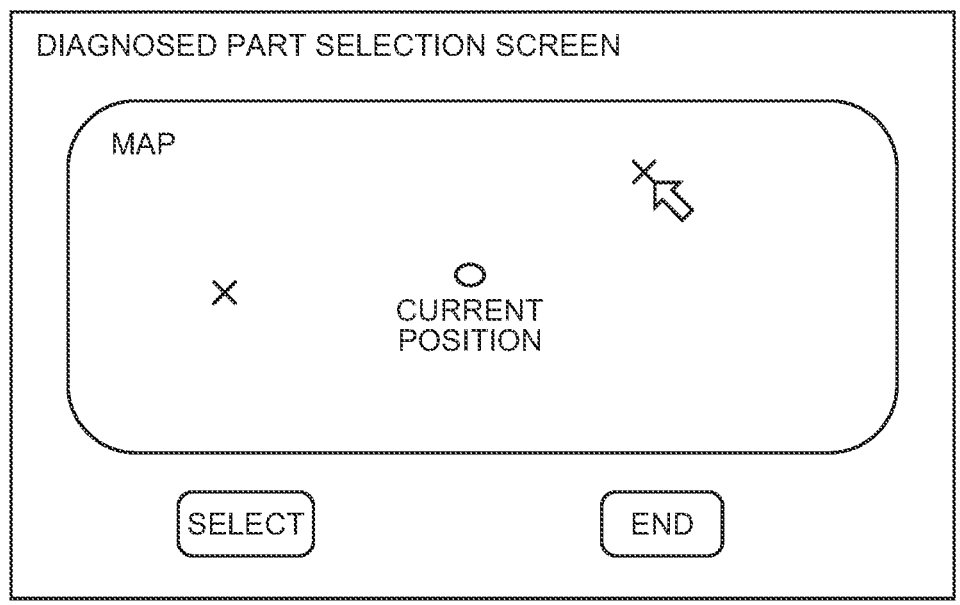
FIG. 11 illustrates an example of a diagnosed part selection screen displayed on the screen display unit of the diagnosis device according to the first exemplary embodiment of the present invention.

FIG. 11 illustrates an example of a diagnosed part selection screen. The diagnosed part selection screen of this example includes a map, a Select button, and an End button. On the map, a current position icon (a circle mark on the figure) indicating the current position of the camera 130, and a past position icon (x mark on the figure) indicating a past capturing position. The control unit 1176 searches the diagnosed part database 1166 using the current position of the camera 130 as the key, to thereby acquire, from the diagnosed part database 1166, the diagnosed part information 11661 having a position within a given distance from the current position as the registered capturing position 11664. Then, the control unit 1176 displays the past position icon at the position indicated by the registered captured position 11664 of the acquired diagnosed part information 11661. In the case of performing diagnosis on the part that is the same as the past diagnosed part, the operator places the mouse cursor on the desired past position icon and turns on the Select button. To end the selection of the diagnosed part, the operator turns on the End button. When the control unit 1176 detects that the End button has been turned on (step S22), the control unit 1176 ends the processing of FIG. 10.

When detecting that the Select button has been turned on (step S23), the control unit 1176 creates a capturing position/capturing direction guide screen on the basis of the diagnosed part information 11661 corresponding to the selected past position icon, and displays it on the screen display unit 114 (step S24).

Figure 12:
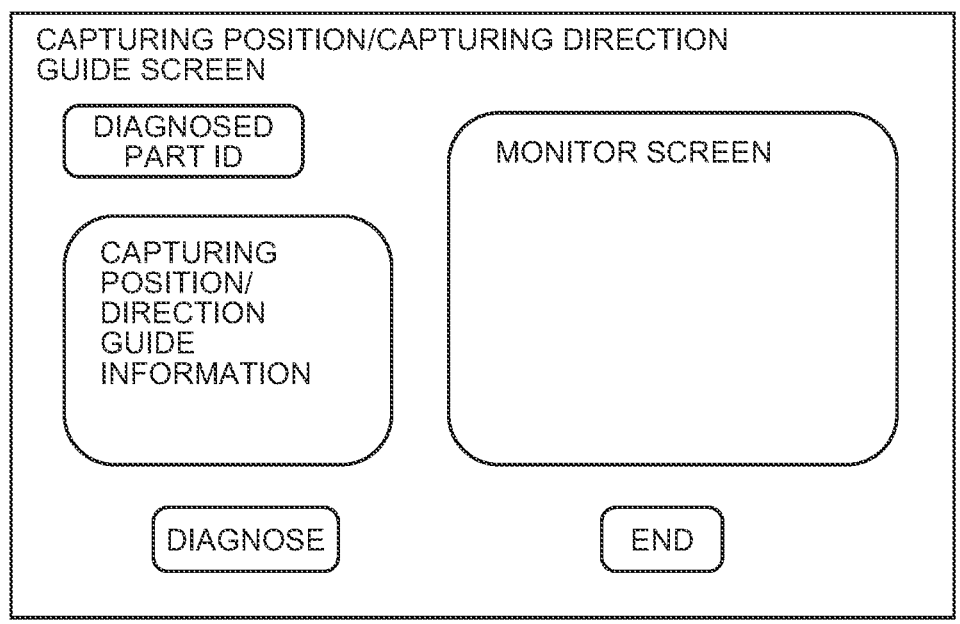
FIG. 12 illustrates an example of a capturing position/capturing direction guide screen displayed on the screen display unit of the diagnosis device according to the first exemplary embodiment of the present invention.

FIG. 12 illustrates an example of the capturing position/capturing direction guide screen. The capturing position/capturing direction guide screen of this example includes a monitor screen, a diagnosed part ID display field, a capturing position/capturing direction guide information display field, a Diagnose button, and an End button. The monitor screen displays on a monitor a captured image of the camera 130. Moreover, when matching between the captured image of the camera 130 and the registered captured image succeeds, the monitor screen displays a synthetic image, described above, included in the image matching result 1165. The capturing position/capturing direction guide information display field displays information related to the positional difference between the position of the camera 130 and the position of the camera 130 when the registered captured image was captured, and the directional difference between the capturing direction of the camera 130 and the capturing direction of the camera 130 when the registered captured image was captured. Further, the control unit 1176 converts the information displayed on the capturing position/capturing direction guide information display field into a voice, and outputs it from the voice output unit 115. For example, messages such as "position and capturing direction are good", "too close, please move behind", "position is closer to the right, please move to the left", and "capturing direction is closer to the right, please face toward the left" are output.

With the capturing position/capturing direction guide information displayed and output by the voice, the operator can recognize whether or not the position and the capturing direction of the camera 130 are appropriate. Moreover, with the capturing position/capturing direction guide information displayed and output by the voice, the operator can determine how to change the position and the capturing direction of the camera 130.

The control unit 1176 detects whether or not the End button is turned on (step S25) or whether or not the Diagnose button is turned on (step S26) after the capturing position/capturing guide screen has been displayed, and when no button is turned on, returns to step S24. Therefore, when the position and the capturing direction of the camera 130 are changed by the operator, the capturing position/capturing direction guide screen is recreated and redrawn according to the change. Then, when the Diagnose button is turned on, the control unit 1176 activates the diagnosis unit 1175 and executes diagnosis (step S27). Further, when diagnosis by the diagnosis unit 1175 ends, the control unit 1176 reads the diagnosis result of the diagnosis unit 1175 from the diagnosis result database 1167, displays it on the screen display unit 114, and/or outputs it to an external terminal via the communication I/F unit 112 (step S28). Then, the control unit 1176 returns to step S24. Meanwhile, when the End button is turned on, the control unit 1176 ends the processing of FIG. 10.

Figure 13:
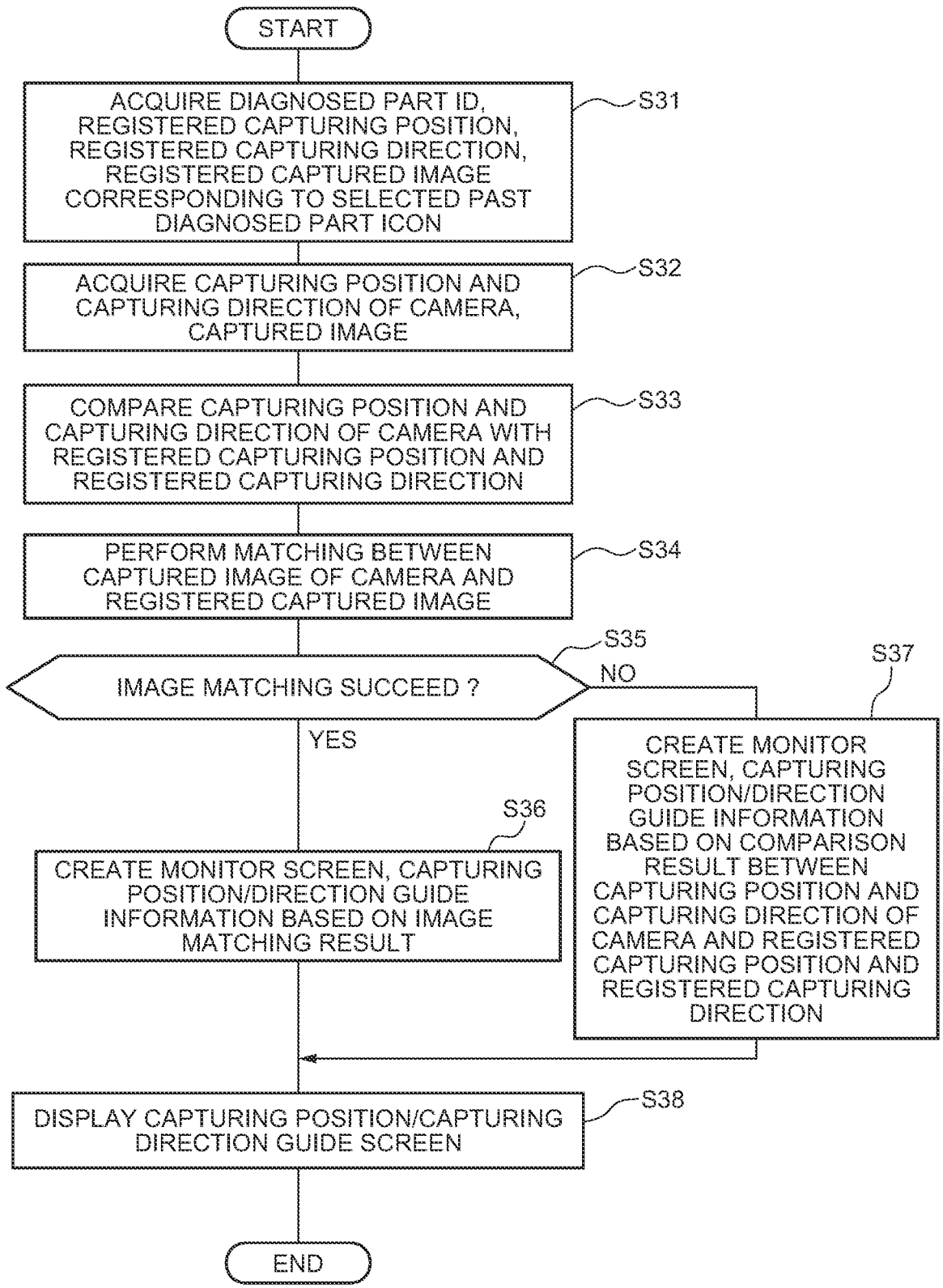
FIG. 13 is a flowchart showing the details of an operation of creating and displaying a capturing position/capturing direction guide screen by the diagnosis device according to the first exemplary embodiment of the present invention.

FIG. 13 is a flowchart showing the details of step S24 of FIG. 9. First, the control unit 1176 acquires, from the diagnosed part information 11661 corresponding to the selected past position icon, a diagnosed part ID, a registered capturing position, a registered capturing direction, and a registered captured image (step S31). Then, the control unit 1176 acquires the capturing position 1162, the capturing direction 1163, and the captured image 1164, from the storage unit 116 (step S32). Then, the control unit 1176 compares the capturing position 1162 and the capturing direction 1163 with the registered capturing position and the registered capturing direction, and detects differences between the two positions and between the two directions (step S33). Then, the control unit 1176 allows the image matching unit 1174 to perform comparison between the captured image 1164 and the registered captured image (step S34). Then, the control unit 1176 acquires the image matching result 1165 from the storage unit 116, and determines whether or not the matching has succeeded (step S35).

When the matching has succeeded, the control unit 1176 then creates a synthetic image included in the image matching result 1165 as a monitor image, and creates capturing position/capturing direction guide information on the basis of the positional difference between the position of the camera 130 and the position of the camera 130 when the registered captured image was captured, and the directional difference between the capturing direction of the camera 130 and the capturing direction of the camera 130 when the registered captured image was captured, included in the image matching result 1165 (step S36). On the contrary, when the matching has failed, the control unit 1176 creates the captured image 1164 as a monitor screen, and creates capturing position/capturing direction guide information on the basis of the positional difference and the directional difference detected at step S33 (step S37). Then, the control unit 1176 assembles a capturing position/capturing direction guide screen from the created monitor screen, the capturing position/capturing direction guide information, and other screen elements, and displays it on the screen display unit 114 (step S38).

The capturing position/capturing direction guide screen is created through the processing described above. Therefore, in the case where a part that is the same as the registered captured image is not captured by the camera 130 and matching does not succeed, in the capturing position/capturing direction guide information, information of the difference between the position of the camera 130 detected by the GPS receiver 132 and the registered capturing position is displayed. Further, in the capturing position/capturing direction guide information, information about the difference between the capturing direction of the camera 130, calculated from the azimuth and the acceleration detected by the azimuth sensor 133 and the acceleration sensor 134, and the registered capturing direction is displayed. With such information, the operator can roughly adjust the position and the capturing direction of the camera 130.

Further, in the case where a part that is the same as the registered captured image is captured by the camera 130 and the matching has succeeded, on the monitor screen, a synthetic image in which an image converted by applying an estimated homography matrix to the registered captured image and the captured image are synthesized is displayed. Further, in the capturing position/capturing direction guide information, the capturing position/direction guide information created on the basis of information about the difference between the position of the camera 130 and the position of the camera when the registered captured image was captured and the difference between the capturing direction of the camera 130 and the capturing direction of the camera when the registered captured image was captured, detected based on the estimated homography matrix, is displayed. Moreover, the created capturing position/direction guide information is converted into a voice and output. Therefore, the operator can finely adjust the position and the capturing direction of the camera 130 correctly, and can capture the partial area 141 of the structure 140 from the same position and the same capturing direction as the registered captured image.

Second Exemplary Embodiment

Next, a diagnosis device 200 according to a second exemplary embodiment of the present invention will be described.

Figure 14:
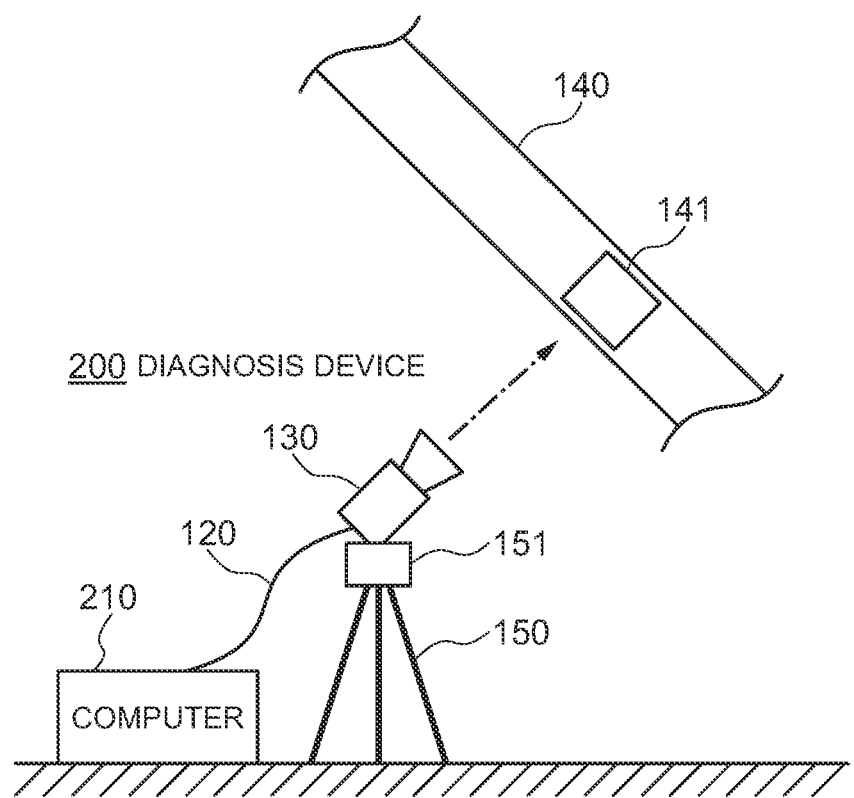
FIG. 14 is a diagram illustrating an exemplary configuration of a diagnosis device according to a second exemplary embodiment of the present invention.

FIG. 14 illustrates an exemplary configuration of the diagnosis device 200 according to the present embodiment. In FIG. 14, the same reference numerals as those of FIG. 1 denote the same parts. A reference numeral 210 denotes a computer. The computer 210 is configured to detect differences between the capturing position/direction of a camera and the position/direction of a past diagnosed part, by means a method similar to that of the first exemplary embodiment, create a crack image in which a crack on the structure 140 are emphasized from an image of the partial area 141 of the structure 140 captured by the camera 130, and by comparing the crack image with a registered crack image stored in advance, detect the difference between the capturing position/direction of the camera and the position/direction of the past diagnosed part.

Figure 15:
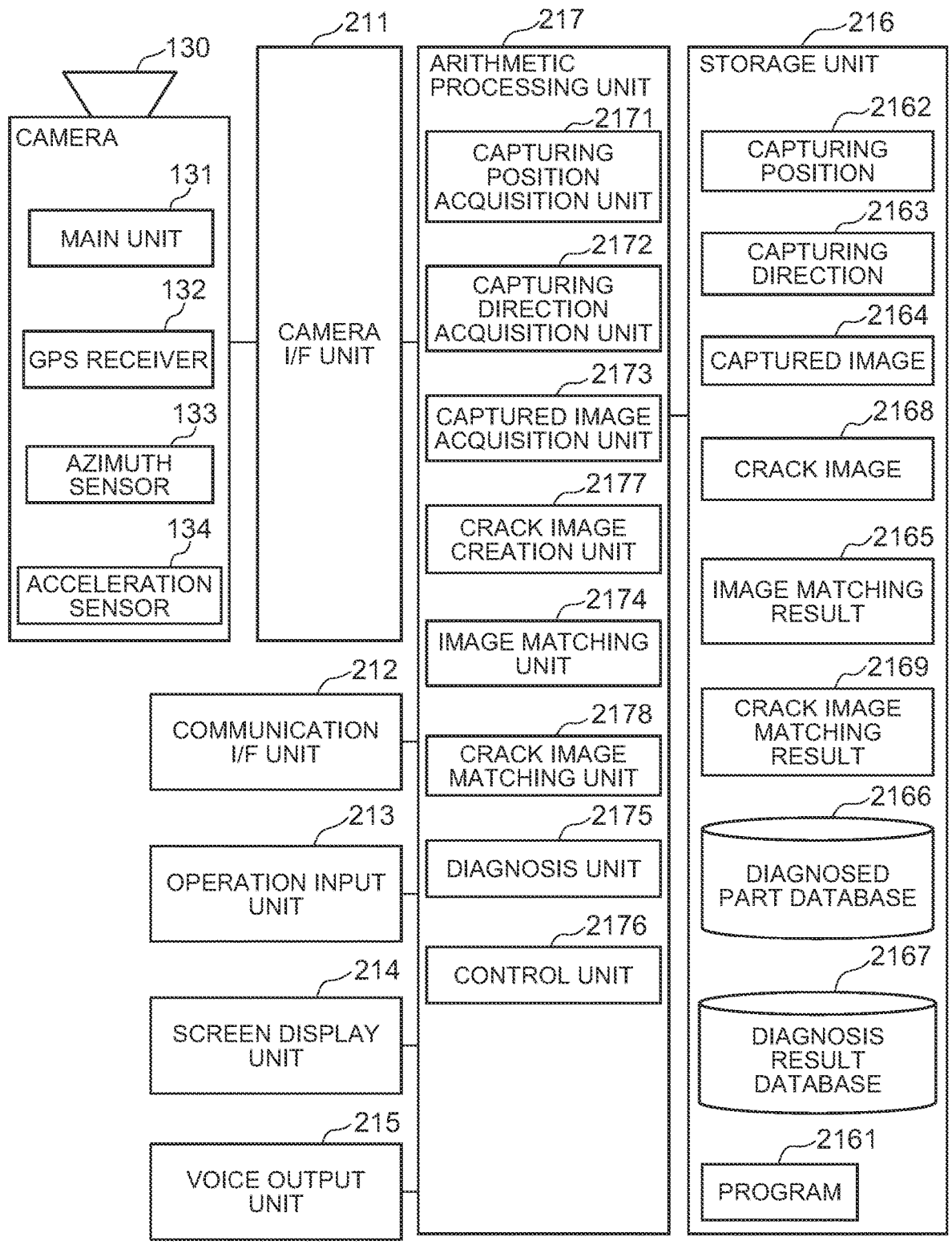
FIG. 15 is a block diagram illustrating an exemplary configuration of a computer in the diagnosis device according to the second exemplary embodiment of the present invention.

FIG. 15 is a block diagram illustrating an exemplary configuration of the computer 210. Referring to FIG. 15, the computer 210 includes a camera I/F unit 211, a communication I/F unit 212, an operation input unit 213, a screen display unit 214, a voice output unit 215, a storage unit 216, and an arithmetic processing unit 217. Among them, the camera I/F unit 211, the communication I/F unit 212, the operation input unit 213, the screen display unit 214, and the voice output unit 215 are the same as the camera I/F unit 111, the communication I/F unit 112, the operation input unit 113, the screen display unit 114, and the voice output unit 115 of FIG. 1.

The storage unit 216 is configured of storage devices such as a hard disk and a memory, and is configured to store therein processing information and a program 2161 necessary for various types of processing in the arithmetic processing unit 217. The program 2161 is a program for implementing various processing units by being read and executed by the arithmetic processing unit 217, and is read in advance from an external device or a storage medium via a data input-output function such as the communication I/F unit 212 and is stored in the storage unit 216. Main processing information to be stored in the storage unit 216 includes a capturing position 2162, a capturing direction 2163, a captured image 2164, an image matching result 2165, a diagnosed part database 2166, a diagnosis result database 2167, a crack image 2168, and a crack image matching result 2169. Among them, the capturing position 2162, the capturing direction 2163, the captured image 2164, the image matching result 2165, and the diagnosis result database 2167 are the same as the capturing position 1162, the capturing direction 1163, the captured image 1164, the image matching result 1165, and the diagnosis result database 1167 of FIG. 2.

The crack image 2168 is an image in which a crack on the structure 140 is emphasized from an image (captured image) of the partial area 141 of the structure 140 captured by the camera 130.

The crack image matching result 2169 is data representing the matching result between a crack image created from an image (captured image) of the partial area 141 of the structure 140 captured by the camera 130 and a crack image (registered crack image) stored in the diagnosed part database 2166.

The diagnosed part database 2166 is a storage unit in which information related to diagnosed parts is stored. FIG. 16 illustrates an exemplary format of the diagnosed part information 21661 stored in the diagnosed part database 2166. The diagnosed part information 21661 of this example is configured of a diagnosed part ID 21662, registration date/time 21663, a registered capturing position 21664, a registered capturing direction 21665, a registered captured image 21666, and a registered crack image 21667. Among them, the diagnosed part ID 21662, the registration date/time 21663, the registered capturing position 21664, the registered capturing direction 21665, and the registered captured image 21666 are the same as the diagnosed part ID 11662, the registration date/time 11663, the registered capturing position 11664, the registered capturing direction 11665, and the registered captured image 11666 of FIG. 3. The registered crack image 21667 is a crack image created from an image, captured by the camera 130, of the partial area 141 of the structure 140 from the registered capturing position 21664 in the registered capturing direction 21665.

The arithmetic processing unit 217 has a processor such as MPU and the peripheral circuits, and is configured to read and execute the program 2161 from the storage unit 216 to allow the hardware and the program 2161 to cooperate with each other to thereby implement the various processing units. The main processing units implemented by the arithmetic processing unit 217 include a capturing position acquisition unit 2171, a capturing direction acquisition unit 2172, a captured image acquisition unit 2173, an image matching unit 2174, a diagnosis unit 2175, a control unit 2176, a crack image creation unit 2177, and a crack image matching unit 2178. Among them, the capturing position acquisition unit 2171, the capturing direction acquisition unit 2172, the captured image acquisition unit 2173, the image matching unit 2174, and the diagnosis unit 2175 are the same as the capturing position acquisition unit 1171, the capturing direction acquisition unit 1172, the captured image acquisition unit 1173, the image matching unit 1174, and the diagnosis unit 1175 of FIG. 2.

The crack image creation unit 2177 is configured to create an image in which a crack on the structure 140 is emphasized from an image (captured image) of the partial area 141 of the structure 140 captured by the camera 130. As a method of creating a crack image from a captured image, any method may be used. For example, the crack image creation unit 2177 may be configured to use the method described in Patent Literature 4, that is, detect changes in positions at a plurality of measurement points on the structure, detect a crack on the basis of the detected changes in positions of the measurement points, and create a binary image in which a detected crack part takes a value 1 and a non-crack part takes a value 0. The crack image creation unit 2177 may be configured to detect a crack from a captured image by a method similar to the method used in the diagnosis unit 2175, and create a binary image in which a detected crack part takes a value 1 and a non-crack part takes a value 0, for example.

The crack image matching unit 2178 is configured to compare the crack image 2168 with a registered crack image stored in the diagnosed part database 2166, and detect a positional difference between the position of the camera 130 and the position of the camera 130 when the registered captured image was captured, and a directional difference between the capturing direction of the camera 130 and the capturing direction of the camera 130 when the registered captured image was captured. A method of matching crack images is not particularly limited. For example, any matching method such as a matching method based on image similarity or a matching method by feature point extraction and feature point association may be used. An exemplary configuration of the crack image matching unit 2178 will be described below.

For example, the crack image matching unit 2178 performs extraction of feature points, association of feature points, estimation of a homography matrix, calculation of differences in position and direction, image transformation based on a homography matrix, image synthesis, and output of an image matching result, in this order.

That is, first, the crack image matching unit 2178 uses an arbitrary method such as SIFT, Random, or the like to extract a plurality of feature points from the crack image 2168 and the registered crack image. Then, the crack image matching unit 2178 associates a feature point extracted from the crack image 2168 with a feature point extracted from the registered crack image that is similar thereto, as a feature point pair. When at least the predetermined number of feature point pairs are not obtained, the crack image matching unit 2178 determines that matching has failed, and stores a crack image matching result 2169 indicating a matching failure in the storage unit 216 and ends the processing. When at least the predetermined number of feature point pairs are obtained, the crack image matching unit 2178 computes a homography matrix between the crack image and the registered crack image on the basis of the feature point pairs associated with each other.

Then, the crack image matching unit 2178 detects a difference between the position of the camera 130 and the registered capturing position, and a difference between the capturing direction of the camera 130 and the registered capturing direction, from the homography matrix. Then, the crack image matching unit 2178 transforms the registered crack image on the basis of the homography matrix. Then, the crack image matching unit 2178 synthesizes the registered crack image after being transformed and the crack image 2168. Then, the crack image matching unit 2178 determines that matching has succeeded, creates a crack image matching result 2165 indicating the matching success including the synthesized image and the detected differences in the position and direction, and stores it in the storage unit 216.

FIG. 17 illustrates some examples of synthetic images included in the crack image matching result 2169 when matching has succeeded. In each of the synthetic images, a solid line shows the crack image 2168 and a broken line shows a registered crack image.

In a synthetic image NA, a registered crack image of the same size is synthesized so as to conform to the entire crack image 2168. Such a synthetic image indicates that the position and the capturing direction of the camera 130 and the position and the capturing direction of the camera 130 at the time of capturing the registered captured image match.

In a synthetic image NB, a registered crack image having a similar shape and a larger size is synthesized with the crack image 2168. Such a synthetic image indicates that the position of the camera 130 is closer to the structure side too much, compared with the position of the camera 130 at the time of capturing the registered captured image.

In a synthetic image NC, a registered crack image having a similar shape and a smaller size is synthesized with the crack image 2168. Such a synthetic image indicates that the position of the camera 130 is away from the structure compared with the position of the camera 130 at the time of capturing the registered captured image.

In a synthetic image ND, a registered crack image in which the right side is shorter than the left side is synthesized with the crack image 2168. Such a synthetic image indicates that the position of the camera 130 is close to the left side compared with that of the camera 130 at the time of capturing the registered captured image, so that the capturing direction is close to the right side accordingly.

These synthetic images are examples. Depending on the position and the capturing direction of the camera 130, as shown in a synthetic image NE, areas not matched with the registered crack image and the crack image 2168 may be generated in the crack image 2168 and the registered crack image, respectively.

An exemplary configuration of the crack image matching unit 2178 is as described above.

The control unit 2176 is configured to mainly control the diagnosis device 200.

Hereinafter, operation of the diagnosis device 200 when performing deterioration diagnosis of the structure 140 will be described. In the diagnosis device 200, the following operations differ from those of the diagnosis device 100, and the other operations are the same as those of the diagnosis device 100.

(1) Operation of creating diagnosed part information
(2) Operation of creating capturing position/capturing direction guide screen (1) Operation of Creating Diagnosed Part Information When an operator turns on the Register button of the new diagnosis screen for use of the information about the position and the capturing direction of the camera 130 for the next and subsequent diagnosis, the control unit 2176 creates new diagnosed part information 21661 and registers it in the diagnosed part database 2166. At that time, the crack image creation unit 2177 creates an image in which a crack on the structure 140 is emphasized from an image of the partial area 141 of the structure 140 captured by the camera 130, and stores it in the storage unit 216 as the crack image 2168. The control unit 2176 acquires the capturing position 2162, the capturing direction 2163, the captured image 2164, and the crack image 2168 from the storage unit 216, creates the diagnosed part information 21661 as illustrated in FIG. 16 on the basis of such information, and registers it in the diagnosed part database 2166.

(2) Operation of Creating Capturing Position/Capturing Direction Guide Screen

Figure 18:
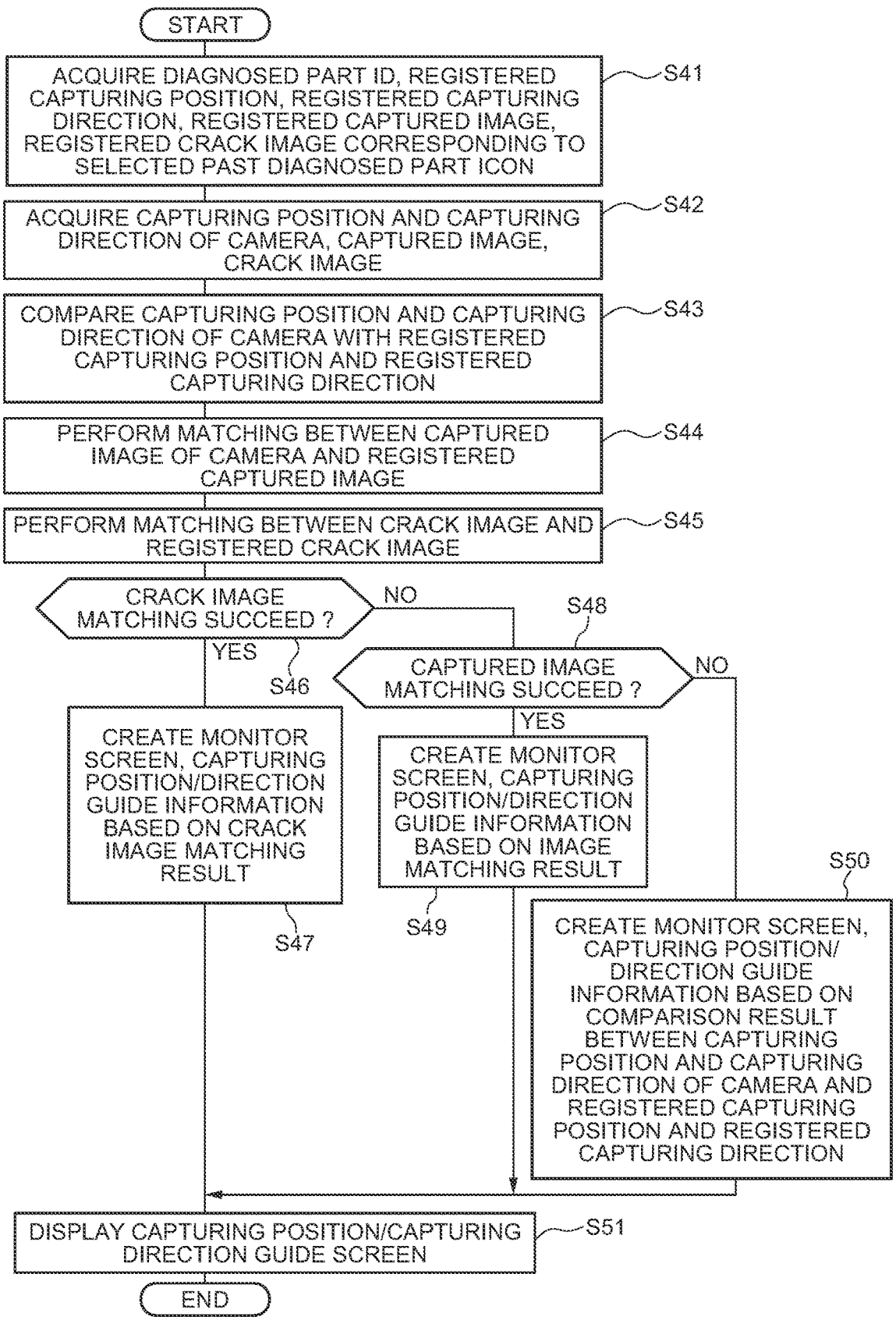
FIG. 18 is a flowchart showing the details of an operation of creating and displaying a capturing position/capturing direction guide screen by the diagnosis device according to the second exemplary embodiment of the present invention.

FIG. 18 is a flowchart showing the details of an operation of creating and displaying a capturing position/capturing direction guide screen. First, the control unit 2176 acquires, from the diagnosed part information 21661 corresponding to a selected past position icon, a diagnosed part ID, a registered capturing position, a registered capturing direction, a registered captured image, and a registered crack image (step S41). Then, the control unit 2176 acquires the capturing position 2162 and the capturing direction 2163 of the camera 130, the captured image 2164, and the crack image 2168 from the storage unit 216 (step S42). Then, the control unit 2176 executes steps S43 to S44 that are the same as steps S33 to S34 of FIG. 13.

Then, the control unit 2176 allows the crack image matching unit 2178 to perform matching between the crack image 2168 and the registered crack image (step S45). Then, the control unit 2176 acquires the crack image matching result 2169 from the storage unit 216, and determines whether or not the matching has succeeded (step S46). When the matching of the crack image has succeeded, the control unit 2176 creates a synthetic image included in the crack image matching result 2169 as a monitor image, and creates capturing position/capturing direction guide information on the basis of the positional difference between the position of the camera 130 and the position of the camera 130 when the registered crack image was captured, and the directional difference between the capturing direction of the camera 130 and the capturing direction of the camera 130 when the registered crack image was captured, included in the crack image matching result 2169 (step S47). Further, when matching of the crack image has failed, the control unit 2176 acquires the image matching result 2165 from the storage unit 216, and determines whether or not the matching has succeeded (step S48). When the image matching has succeeded, the control unit 2176 executes step S49 that is the same as step S36 of FIG. 13. Further, when the image matching has failed, the control unit 2176 executes step S50 that is the same as step S37 of FIG. 13. Then, the control unit 2176 assembles a capturing position/capturing direction guide screen from the created monitor screen, the capturing position/capturing direction guide information, and other screen elements, and displays it on the screen display unit 214 (step S51).

The capturing position/capturing direction guide screen is created through the processing described above. Therefore, in the case where a part that is the same as the registered captured image is not captured by the camera 130 and matching does not succeed, in the capturing position/capturing direction guide information, information about the difference between the position of the camera 130 detected by the GPS receiver 132 and the registered capturing position and the difference between the capturing direction of the camera 130, calculated from the azimuth and the acceleration detected by the azimuth sensor 133 and the acceleration sensor 134, and the registered capturing direction are displayed. With such information, the operator can roughly adjust the position and the capturing direction of the camera 130.

Further, in the case where a part that is the same as the registered captured image is captured by the camera 130 and the matching has succeeded, on the monitor screen, a synthetic image obtained by synthesizing an image transformed by applying an estimated homography matrix to the registered crack image and the crack image captured this time is displayed. Further, in the capturing position/capturing direction guide information, information about the difference between the position of the camera 130 and the position of the camera when the registered captured image was captured, and the difference between the capturing direction of the camera 130 and the capturing direction of the camera when the registered captured image was captured, detected based on the estimated homography matrix, is displayed. Therefore, the operator can finely adjust the position and the capturing direction of the camera 130 correctly, and capture the partial area 141 of the structure 140 from the same position and the same capturing direction as those of the registered captured image. Compared with matching of captured images, matching of crack image has an advantage that there is less mismatch caused by surface dirt due to aging, a change in illumination, and the like.

In the case where a part that is the same as the registered captured image is captured by the camera 130 but no crack or only a few cracks exist, matching of the crack image will fail. However, even in that case, if the same part as the registered captured image is captured by the camera 130, matching of the captured image succeeds. In a state where matching has succeeded, on the monitor screen, a synthetic image obtained by synthesizing an image transformed by applying an estimated homography matrix to the registered captured image and the crack image captured this time is displayed. Further, in the capturing position/capturing direction guide information, information about the difference between the position of the camera 130 and the position of the camera when the registered captured image was captured, and the difference between the capturing direction of the camera 130 and the capturing direction of the camera when the registered captured image was captured, detected based on the estimated homography matrix, is displayed. Therefore, the operator can finely adjust the position and the capturing direction of the camera 130 correctly, and can capture the partial area 141 of the structure 140 from the same position and in the same capturing direction as those of the registered captured image.

In the present embodiment, image matching by the image matching unit 2174 and crack image matching by the crack image matching unit 2178 are performed regularly. However, as a modification of the present embodiment, either one type of matching may be performed depending on the amount of cracks in the registered crack image. That is, when the amount of cracks is equal to or larger than a predetermined amount, matching may be performed only by the crack image matching unit 2178, and when the amount of cracks is less than the predetermined amount, matching may be performed only by the image matching unit 2174.

Third Exemplary Embodiment

Next, a diagnosis device 300 according to a third exemplary embodiment of the present invention will be described.

Figure 19:
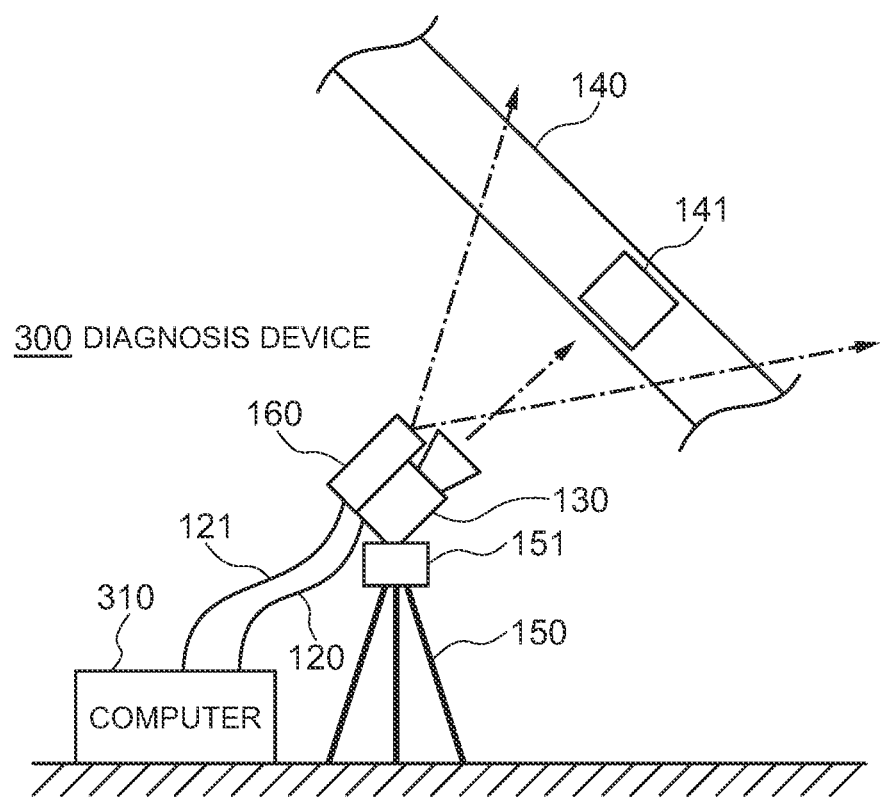
FIG. 19 is a diagram illustrating an exemplary configuration of a diagnosis device according to a third exemplary embodiment of the present invention.

FIG. 19 illustrates an exemplary configuration of the diagnosis device 300 according to the present embodiment. In FIG. 19, reference numerals that are the same as those in FIG. 1 denote the same parts. A reference numeral 310 denotes a computer, a reference numeral 160 denotes a three-dimensional shape measuring device, a reference numeral 121 denotes a cable connecting the computer 310 and the three-dimensional shape measuring device 160.

The three-dimensional shape measuring device 160 is a sensor for measuring a three-dimensional shape existing in the peripheral environment of the camera 130. The three-dimensional shape measuring device 160 is attached to the camera 130 or the platform 151 so as to keep a certain positional relation with the camera 130. For example, the three-dimensional shape measuring device 160 is attached to the camera 130 such that the facing direction of the center of the scanning angle of the three-dimensional shape measuring device 160 (hereinafter referred to as a three-dimensional shape measuring direction) coincides with the capturing direction of the camera 130. The three-dimensional shape measuring device 160 can be configured using Light Detection and Ranging (LIDAR), a stereo camera, Structure-from-Motion, or the like. A three-dimensional shape to be measured may be a three-dimensional shape of the structure 140 or others.

The computer 310 is configured to detect the difference between the capturing position/direction of the camera and the position/direction of a past diagnosed part by a method similar to that of the second exemplary embodiment, and by comparing the three-dimensional shape of the structure 140 measured by the three-dimensional shape measuring device 160 with a registered three-dimensional shape stored in advance, detect the difference between the capturing position/direction of the camera 130 and the position/direction of the past diagnosed part.

Figure 20:
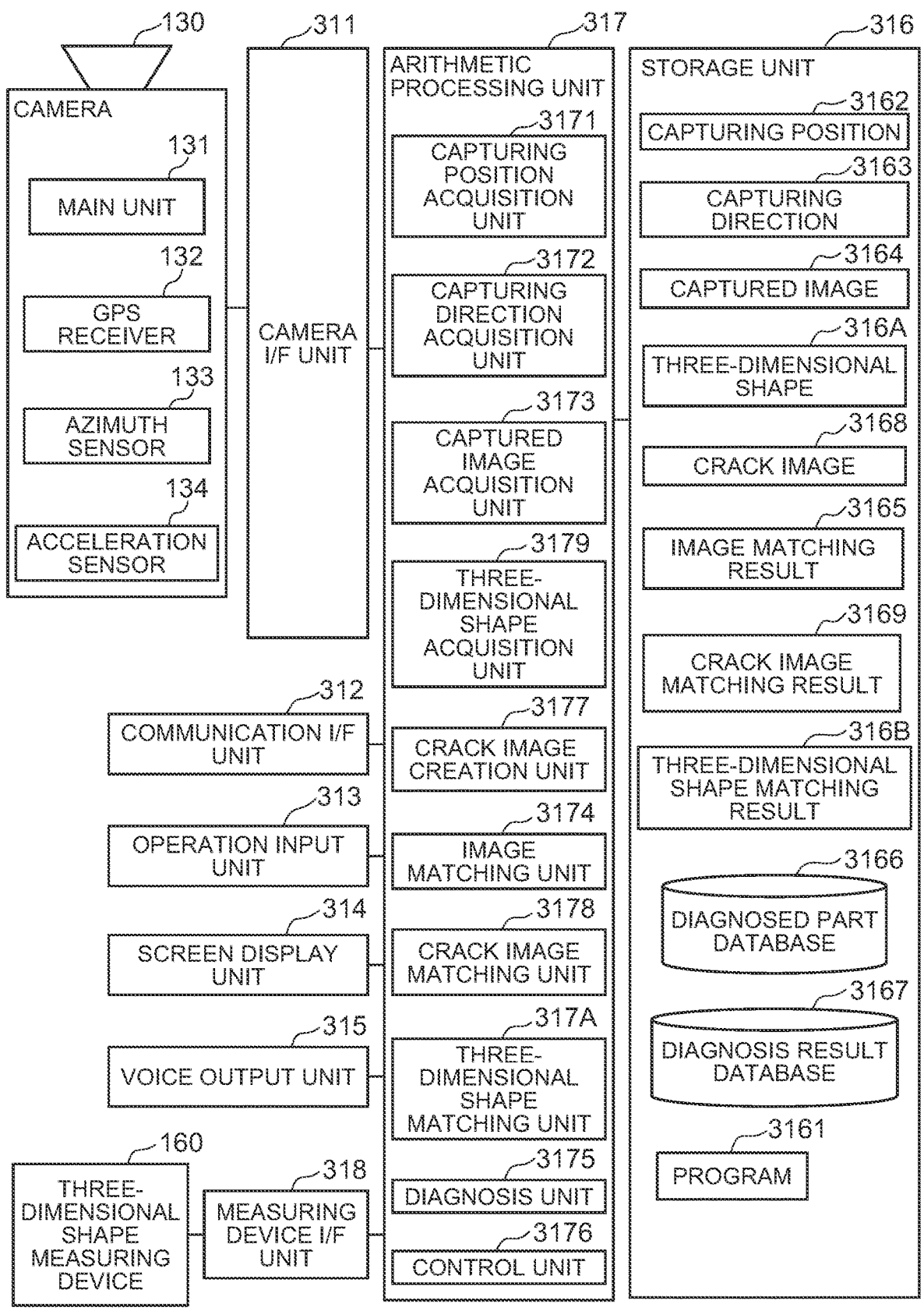
FIG. 20 is a block diagram illustrating an exemplary configuration of a computer in the diagnosis device according to the third exemplary embodiment of the present invention.

FIG. 20 is a block diagram illustrating an exemplary configuration of the computer 310. Referring to FIG. 20, the computer 310 includes a camera I/F unit 311, a communication I/F unit 312, an operation input unit 313, a screen display unit 314, a voice output unit 315, a storage unit 316, an arithmetic processing unit 317, and a measuring device I/F unit 318. Among them, the camera I/F unit 311, the communication I/F unit 312, the operation input unit 313, the screen display unit 314, and the voice output unit 315 are the same as the camera I/F unit 211, the communication I/F unit 212, the operation input unit 213, the screen display unit 214, and the voice output unit 215 of FIG. 15. The measuring device I/F unit 318 is configured to transmit and receive data between the three-dimensional shape measuring device 160 and the arithmetic processing unit 317.

The storage unit 316 is configured of storage devices such as a hard disk and a memory, and is configured to store therein processing information and a program 3161 necessary for various types of processing in the arithmetic processing unit 317. The program 3161 is a program for implementing various processing units by being read and executed by the arithmetic processing unit 317, and is read in advance from an external device or a storage medium via a data input-output function such as the communication I/F unit 312 and is stored in the storage unit 316. Main processing information to be stored in the storage unit 316 includes a capturing position 3162, a capturing direction 3163, a captured image 3164, an image matching result 3165, a diagnosed part database 3166, a diagnosis result database 3167, a crack image 3168, a crack image matching result 3169, a three-dimensional shape 316A, and a three-dimensional shape matching result 316B. Among them, the capturing position 3162, the capturing direction 3163, the captured image 3164, the image matching result 3165, the diagnosis result database 3167, the crack image 3168, and the crack image matching result 3169 are the same as the capturing position 2162, the capturing direction 2163, the captured image 2164, the image matching result 2165, the diagnosis result database 2167, the crack image 3168, and the crack image matching result 2169 of FIG. 15.

The three-dimensional shape 316A is data representing a three-dimensional shape existing in the peripheral environment measured by the three-dimensional shape measuring device 160. The three-dimensional shape 316A may be a point group, a polygon, or a texture.

The three-dimensional shape matching result 316B is data representing a matching result between the three-dimensional shape 316A and a registered three-dimensional shape stored in the diagnosed part database 3166.

The diagnosed part database 3166 is a storage unit in which information related to diagnosed parts is stored. FIG. 21 illustrates an exemplary format of the diagnosed part information 31661 stored in the diagnosed part database 3166. The diagnosed part information 31661 of this example is configured of a diagnosed part ID 31662, registration date/time 31663, a registered capturing position 31664, a registered capturing direction 31665, a registered captured image 31666, a registered crack image 31667, and a registered three-dimensional shape 31668. Among them, the diagnosed part ID 31662, the registration date/time 31663, the registered capturing position 31664, the registered capturing direction 31665, the registered captured image 31666, and the registered crack image 31667 are the same as the diagnosed part ID 21662, the registration date/time 21663, the registered capturing position 21664, the registered capturing direction 21665, the registered captured image 21666, and the registered crack image 21667 of FIG. 16. The registered three-dimensional shape 31668 is data representing the three-dimensional shape, measured by the three-dimensional shape measuring device 160, of the periphery of the position of the camera 130 when the registered captured image was captured.

The arithmetic processing unit 317 has a processor such as an MPU and the peripheral circuits, and is configured to read and execute the program 3161 from the storage unit 316 to allow the hardware and the program 3161 to cooperate with each other to thereby implement the various processing units. The main processing units implemented by the arithmetic processing unit 317 include a capturing position acquisition unit 3171, a capturing direction acquisition unit 3172, a captured image acquisition unit 3173, an image matching unit 3174, a diagnosis unit 3175, a control unit 3176, a crack image creation unit 3177, a crack image matching unit 3178, a three-dimensional shape acquisition unit 3179, and a three-dimensional shape matching unit 317A. Among them, the capturing position acquisition unit 3171, the capturing direction acquisition unit 3172, the captured image acquisition unit 3173, the image matching unit 3174, the diagnosis unit 3175, the crack image creation unit 3177, and the crack image matching unit 3178 are the same as the capturing position acquisition unit 2171, the capturing direction acquisition unit 2172, the captured image acquisition unit 2173, the image matching unit 2174, the diagnosis unit 2175, the crack image creation unit 2177, and the crack image matching unit 2178 of FIG. 15.

The three-dimensional shape acquisition unit 3179 is configured to acquire the measured data of a three-dimensional object from the three-dimensional shape measuring device 160, and store it in the storage unit 316 as the three-dimensional shape 316A.

The three-dimensional shape matching unit 317A is configured to compare the three-dimensional shape 316A with the registered three-dimensional shape stored in the diagnosed part database 3166, and detect the difference between the position of the three-dimensional shape measuring device 160 and the position of the three-dimensional shape measuring device 160 when the registered three-dimensional shape was measured, and the directional difference between the center of the measuring direction of the three-dimensional shape measuring device 160 and the center of the measuring direction of the three-dimensional shape measuring device 160 when the registered three-dimensional shape was measured. The method of matching the three-dimensional shapes is not particularly limited. For example, any matching method such as a matching method based on image similarity or Iterative Closest Point (ICP) may be used. Hereinafter, an exemplary operation of the three-dimensional shape matching unit 317A, when using ICP, will be described.

The three-dimensional shape matching unit 317A obtains closest points between two point groups where the three-dimensional shape 316A forms one point group and the registered three-dimensional shape 31668 forms another point group, as corresponding points, and repeats processing of estimating a geometric transformation matrix for reducing the distance between the corresponding points, to thereby perform position matching of the two point groups. When the matching fails, the three-dimensional shape matching unit 317A stores the three-dimensional shape matching result 316B indicating the result in the storage unit 316 and ends the processing.

Meanwhile, when the matching succeeds, the three-dimensional shape matching unit 317A transforms the registered three-dimensional shape on the basis of the estimated geometric transformation matrix. Then, the three-dimensional shape matching unit 317A synthesizes the registered three-dimensional shape after being transformed and the three-dimensional shape 316A. Then, the three-dimensional shape matching unit 317A detects, on the basis of the estimated geometric transformation matrix, the positional difference between the position of the three-dimensional shape measuring device 160 and the position of the three-dimensional shape measuring device 160 when the registered three-dimensional shape was measured, and the directional difference between the three-dimensional shape measuring direction of the three-dimensional shape measuring device 160 and the three-dimensional shape measuring direction of the three-dimensional shape measuring device 160 when the registered three-dimensional shape was measured, as the difference between the position of the camera 130 and the position of the camera 130 when the registered captured image was captured and the directional difference between the capturing direction of the camera 130 and the capturing direction of the camera 130 when the registered captured image was captured. Then, the three-dimensional shape matching unit 317A creates the three-dimensional shape matching result 316B indicating the matching success including the synthesized image and the detected differences in the position and the direction, and stores it in the storage unit 316.

Figure 22:
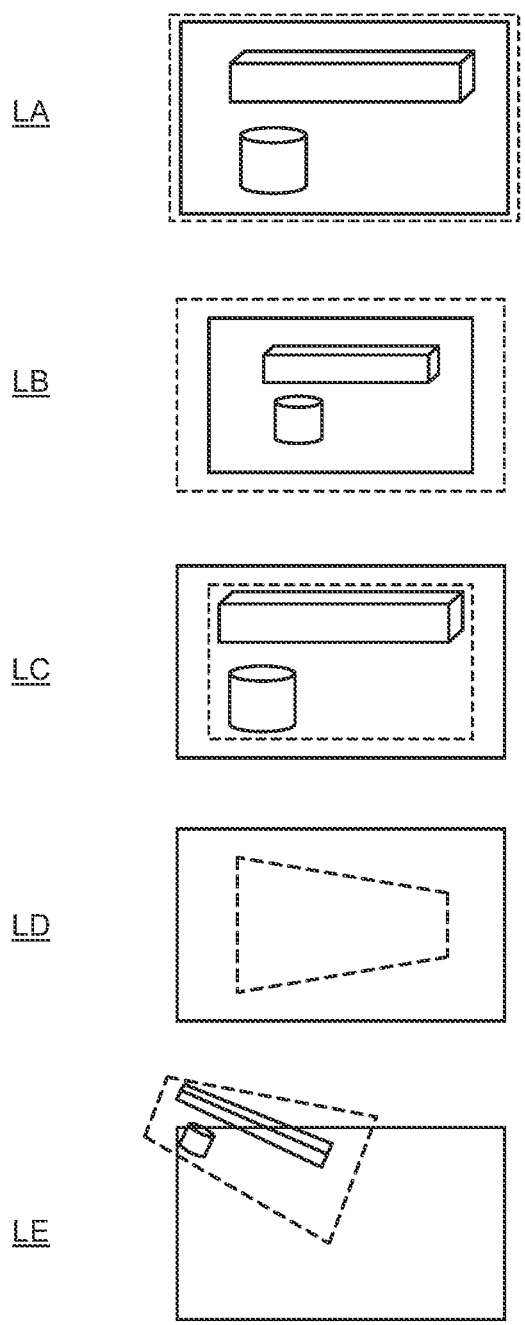
FIG. 22 illustrates some examples of synthetic images included in a three-dimensional shape image matching result in the case of matching success of the computer in the diagnosis device according to the third exemplary embodiment of the present invention.

FIG. 22 illustrates some examples of synthetic images included in the three-dimensional matching result 316B when matching has succeeded. In the synthetic images, a solid line indicates the three-dimensional shape 316A, and a broken line shows the registered three-dimensional shape.

In a synthetic image LA, a registered three-dimensional shape of the same size is synthesized so as to conform to the entire three-dimensional shape 326A. Such a synthetic image indicates that the position and the capturing direction of the camera 130 are the same as the position and the capturing direction of the registered captured image.

In a synthetic image LB, a registered three-dimensional shape of a size smaller than that of the three-dimensional shape 326A is synthesized in a center portion of the three-dimensional shape 326A. Such a synthetic image is generated when the captured image is captured from a closer position than the capturing position of the registered captured image, in the same capturing direction.

In a synthetic image LC, a registered three-dimensional shape of a larger size is synthesized with the three-dimensional shape 326A. Such a synthetic image is generated when the captured image is captured from a farther position than the capturing position of the registered captured image, in the same capturing direction.

In a synthetic image LD, a registered three-dimensional shape in which the right side is shorter than the left side is synthesized in a center portion of the three-dimensional shape 326A. Such a synthetic image is generated when the captured image is captured from a left-sided position from the capturing position of the registered captured image, in a right-sided capturing direction.

These synthetic images are examples. Depending on the position and the capturing direction of the camera 130, as shown in a synthetic image LE, areas not matched with the registered three-dimensional shape and the three-dimensional shape may be generated in the three-dimensional shape and the registered three-dimensional shape, respectively.

An exemplary configuration of the three-dimensional shape matching unit 317A is as described above.

The control unit 3176 is configured to mainly control the diagnosis device 300.

Hereinafter, operation of the diagnosis device 300 when performing deterioration diagnosis of the structure 140 will be described. In the diagnosis device 300, the following operations differ from those of the diagnosis device 200, and the other operations are the same as those of the diagnosis device 200:

(1) Operation of creating diagnosed part information
(2) Operation of creating capturing position/capturing direction guide screen (1) Operation of Creating Diagnosed Part Information When an operator turns on the Register button of the new diagnosis screen for use of the information about the position and the capturing direction of the camera 130 for the next and subsequent diagnosis, the control unit 3176 creates new diagnosed part information 31661 and registers it in the diagnosed part database 3166. At that time, the three-dimensional shape acquisition unit 3179 acquires the measured data of a three-dimensional object from the three-dimensional shape measuring device 160, and stores it in the storage unit 316 as the three-dimensional shape 316A. The control unit 3176 acquires the capturing position 3162, the capturing direction 3163, the captured image 3164, the crack image 3168, and the three-dimensional shape 316A from the storage unit 316, creates the diagnosed part information 31661 as illustrated in FIG. 21 on the basis of such information, and registers it in the diagnosed part database 3166.

(2) Operation of Creating Capturing Position/Capturing Direction Guide Screen

Figure 23:
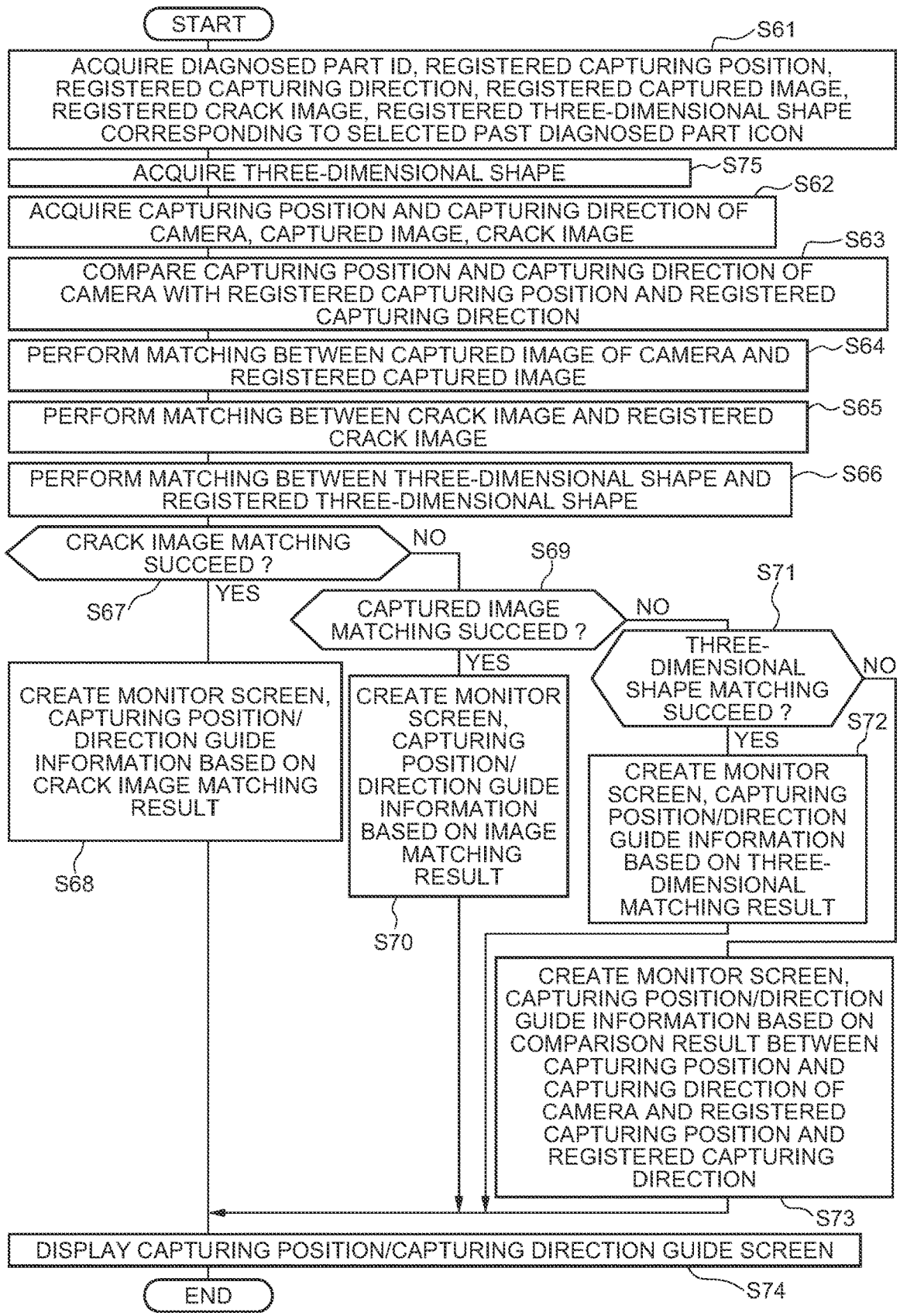
FIG. 23 is a flowchart showing the details of an operation of creating and displaying a capturing position/capturing direction guide screen by the diagnosis device according to the third exemplary embodiment of the present invention.

FIG. 23 is a flowchart showing the details of an operation of creating and displaying a capturing position/capturing direction guide screen. First, the control unit 3176 acquires, from the diagnosed part information 31661 corresponding to the selected past position icon, a diagnosed part ID, a registered capturing position, a registered capturing direction, a registered captured image, a registered crack image, and a three-dimensional shape (step S61). Then, the control unit 3176 acquires the measured data of a three-dimensional object from the three-dimensional shape measuring device 160, and stores it in the storage unit 316 as the three-dimensional shape 316A (step S75). Then, the control unit 3176 executes steps S62 to S65 that are the same as steps S42 to S45 of FIG. 18.

Then, the control unit 3176 allows the three-dimensional shape matching unit 317A to perform matching between the three-dimensional shape 316A and the registered three-dimensional shape (step S66). Then, the control unit 3176 acquires the crack image matching result 3169 from the storage unit 316, and determines whether or not the matching has succeeded (step S67). When the crack image matching has succeeded, the control unit 3176 executes step S68 that is the same as step S47 of FIG. 18. Meanwhile, when the crack image matching has failed, the control unit 3176 acquires the image matching result 3165 from the storage unit 316, and determines whether or not the matching has succeeded (step S69). When the image matching has succeeded, the control unit 3176 executes step S70 that is the same as step S49 of FIG. 18. Meanwhile, when the image matching has failed, the control unit 3176 acquires the three-dimensional shape matching result 316B from the storage unit 316, and determines whether or not the matching has succeeded (step S71). When the matching of the three-dimensional shape has succeeded, the control unit 3176 creates a synthetic image included in the three-dimensional shape matching result 316B as a monitor image, and creates capturing position/capturing direction guide information on the basis of the positional difference between the position of the camera 130 and the position of the camera 130 when the registered captured image was captured, and the directional difference between the capturing direction of the camera 130 and the capturing direction of the camera 130 when the registered captured image was captured, included in the three-dimensional shape matching result 316B (step S72). Meanwhile, when the matching of the three-dimensional shape has failed, the control unit 3176 executes step S73 that is the same as step S50 of FIG. 18. Then, the control unit 3176 assembles a capturing position/capturing direction guide screen from the created monitor screen, the capturing position/capturing direction guide information, and other screen elements, and displays it on the screen display unit 314 (step S74).

The capturing position/capturing direction guide screen is created through the processing described above. Therefore, even in the case where a part that is the same as the registered captured image is not captured by the camera 130 and matching does not succeed, when the matching of three-dimensional shape has succeeded, a synthetic image obtained by synthesizing a three-dimensional shape transformed by applying estimated geometric transformation to the registered three-dimensional shape and the currently measured three-dimensional shape is displayed on the monitor screen. Further, in the capturing position/capturing direction guide information, information about the difference between the position of the camera 130 and the position of the camera when the registered captured image was captured, and the difference between the capturing direction of the camera 130 and the capturing direction of the camera when the registered captured image was captured, detected on the basis of estimated geometric transformation, is displayed. Therefore, the operator can adjust the position and the capturing direction of the camera 130 so as to capture the partial area 141 of the structure 140 from the same position and in the same capturing direction as in the case of the registered captured image. Compared with matching of the captured image, in the matching of the three-dimensional shape, matching can be made in a wide view. Since there is a high possibility that an object or a member having a characteristic shape is included in a wide view, there is an advantage of less mismatch compared with local image matching having less characteristics such as the partial area 141 that is a portion of a concrete wall.

Further, in the case where matching of the three-dimensional shape has failed, in the capturing position/capturing direction guide information, information about the difference between the position of the camera 130 detected by the GPS receiver 132 and the registered capturing position and the difference between the capturing direction of the camera 130, computed from the azimuth and the acceleration detected by the azimuth sensor 133 and the acceleration sensor 134, and the registered capturing direction are displayed. With such information, the operator can roughly adjust the position and the capturing direction of the camera 130.

Further, in the case where a part that is the same as the registered captured image is captured by the camera 130 and the matching has succeeded, on the monitor screen, a synthetic image obtained by synthesizing an image transformed by applying an estimated homography matrix to the registered crack image and the crack image captured this time is displayed. Further, in the capturing position/capturing direction guide information, information about the difference between the position of the camera 130 and the position of the camera when the registered captured image was captured, and the difference between the capturing direction of the camera 130 and the capturing direction of the camera when the registered captured image was captured, detected based on the estimated homography matrix, is displayed. Therefore, the operator can finely adjust the position and the capturing direction of the camera 130 correctly, and can capture the partial area 141 of the structure 140 from the same position and the same capturing direction as those of the registered captured image. Compared with matching of a captured image, matching of a crack image has an advantage that there is less mismatch caused by surface dirt due to aging, a change in illumination, and the like.

In the case where a part that is the same as the registered captured image is captured by the camera 130 but no crack or only a few cracks exist, matching of the crack image will fail. However, even in that case, if the same part as the registered captured image is captured by the camera 130, matching of the captured image succeeds. In the case where matching of the captured image has succeeded, on the monitor screen, a synthetic image obtained by synthesizing an image transformed by applying an estimated homography matrix to the registered captured image and the crack image captured this time are synthesized is displayed. Further, in the capturing position/capturing direction guide information, information about the difference between the position of the camera 130 and the position of the camera when the registered captured image was captured, and the difference between the capturing direction of the camera 130 and the capturing direction of the camera when the registered captured image was captured, detected based on the estimated homography matrix, is displayed. Therefore, the operator can finely adjust the position and the capturing direction of the camera 130 correctly, and can capture the partial area 141 of the structure 140 from the same position and the same capturing direction as those of the registered captured image.

In the present embodiment, image matching by the image matching unit 3174 and crack image matching by the crack image matching unit 3178 are performed regularly. However, as a modification of the present embodiment, either one type of matching may be performed depending on the amount of cracks in the registered crack image. For example, when the amount of cracks is equal to or larger than a predetermined amount, matching may be performed only by the crack image matching unit 3178, and when the amount of cracks is less than the predetermined amount, matching may be performed only by the image matching unit 3174.

Fourth Exemplary Embodiment

Figure 24:
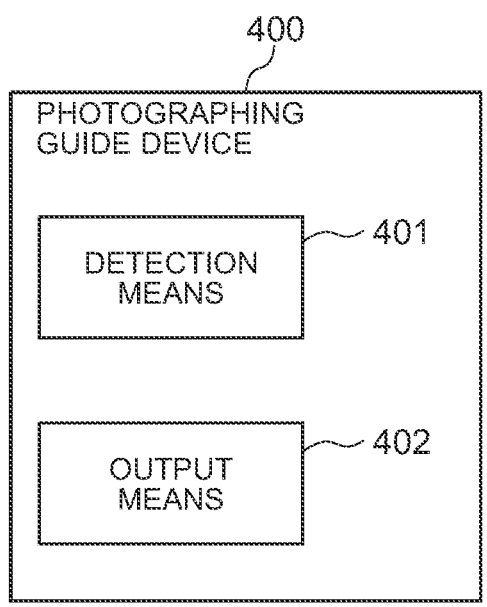
FIG. 24 is a block diagram illustrating a photographing guide device according to a fourth exemplary embodiment of the present invention.

Referring to FIG. 24, a photographing guide device 400 according to a fourth exemplary embodiment of the present invention is configured to include a detection means 401 and an output means 402.

The detection means 401 is configured to compare a candidate image of a structure captured from a capturing candidate position in a capturing candidate direction with a registered image of the structure captured from a given capturing position in a given capturing direction and stored in advance, to thereby detect a positional difference between the capturing candidate position and the given capturing position. The detection means 401 may be configured similarly to the image matching unit 1174 of FIG. 2, but is not limited thereto.

The output means 402 is configured to output information indicating the positional difference detected by the detection means 401. The output means 402 may be configured similarly to the control unit 1176 of FIG. 2, but is not limited thereto.

The photographing guide device 400 configured as described above operates as described below. First, the detection means 401 compares a candidate image of a structure captured from a capturing candidate position in a capturing candidate direction with a registered image of the structure captured from a given capturing position in a given capturing direction and stored in advance, to thereby detect a positional difference between the capturing candidate position and the given capturing position. Then, the output means 402 outputs information indicating the positional difference detected by the detection means 401.

As described above, according to the present embodiment, the detection means 401 compares a candidate image of a structure captured from a capturing candidate position in a capturing candidate direction with a registered image of the structure captured from a given capturing position in a given capturing direction and stored in advance, to thereby detect a positional difference between the capturing candidate position and the given capturing position, and the output means 402 outputs information indicating the positional difference detected by the detection means 401. Therefore, by changing the capturing candidate position so as to make the positional difference to be output small, an operator can capture the structure from the same capturing position every time.

While the present invention has been described with reference to the exemplary embodiments described above, the present invention is not limited to the above-described embodiments. The form and details of the present invention can be changed within the scope of the present invention in various manners that can be understood by those skilled in the art.

The present invention is based upon and claims the benefit of priority from Japanese patent application No. 2019-

002501, filed on Jan. 10, 2019, the disclosure of which is incorporated herein in its entirety by reference.

INDUSTRIAL APPLICABILITY

The present invention is applicable to the case of analyzing an image of a structure such as a bridge captured by an imaging device and diagnosing of the soundness of the structure periodically, for example.

The whole or part of the exemplary embodiments disclosed above can be described as, but not limited to, the following supplementary notes.

(Supplementary Note 1)
A photographing guide device comprising:
detection means for comparing a candidate image of a structure captured from a capturing candidate position in a capturing candidate direction with a registered image of the structure captured from a given capturing position in a given capturing direction and stored in advance, thereby detecting a positional difference between the capturing candidate position and the given capturing position; and
output means for outputting information indicating the positional difference detected.

(Supplementary Note 2)
The photographing guide device according to supplementary note 1, wherein
the detection means further detects a directional difference between the capturing candidate direction and the given capturing direction, and
the output means further outputs information indicating the directional difference detected.

(Supplementary Note 3)
The photographing guide device according to supplementary note 2, wherein
the detection means estimates a homography matrix of the candidate image and the registered image, and detects the directional difference on a basis of the homography matrix.

(Supplementary Note 4)
The photographing guide device according to any of supplementary notes 1 to 3, wherein
the detection means estimates a homography matrix of the candidate image and the registered image, and detects the positional difference on a basis of the homography matrix.

(Supplementary Note 5)
The photographing guide device according to any of supplementary notes 1 to 4, wherein
the detection means estimates a homography matrix of the candidate image and the registered image, transforms the registered image on a basis of the homography matrix, and generates a synthetic image in which the registered image after being transformed and the candidate image are synthesized.

(Supplementary Note 6)
The photographing guide device according to supplementary note 1 or 2, wherein
the detection means further generates a crack image in which a crack on the structure is emphasized from the candidate image, and compares the generated crack image with a registered crack image that is generated from the registered image and stored in advance, to thereby detect the positional difference between the capturing candidate position and the given capturing position.

(Supplementary Note 7)
The photographing guide device according to supplementary note 5, wherein
the detection means further generates a crack image in which a crack on the structure is emphasized from the candidate image, and compares the generated crack image with a registered crack image that is generated from the registered image and stored in advance, to thereby detect the directional difference between the capturing candidate direction and the given capturing direction.

(Supplementary Note 8)
The photographing guide device according to supplementary note 7, wherein
the detection means estimates a homography matrix of the crack image and the registered crack image, and detects the directional difference on a basis of the homography matrix.

(Supplementary Note 9)
The photographing guide device according to any of supplementary notes 6 to 8, wherein
the detection means estimates a homography matrix of the crack image and the registered crack image, and detects the positional difference on a basis of the homography matrix.

(Supplementary Note 10)
The photographing guide device according to any of supplementary notes 6 to 9, wherein
the detection means estimates a homography matrix of the crack image and the registered crack image, transforms the registered crack image on a basis of the homography matrix, and generates a synthetic image in which the registered crack image after being transformed and the crack image are synthesized.

(Supplementary Note 11)
The photographing guide device according to supplementary note 1 or 2, wherein
the detection means further compares a candidate three-dimensional shape obtained by measuring a three-dimensional shape of a peripheral environment from the capturing candidate position with a registered three-dimensional shape obtained by measuring the three-dimensional shape of the peripheral environment from the given capturing position and stored in advance, to thereby detect the positional difference between the capturing candidate position and the given capturing position.

(Supplementary Note 12)
The photographing guide device according to supplementary note 11, wherein
the detection means further compares the candidate three-dimensional shape obtained by measuring the three-dimensional shape of the peripheral environment from the capturing candidate position with the registered three-dimensional shape obtained by measuring the three-dimensional shape of the peripheral environment from the given capturing position and stored in advance, to thereby detect the directional difference between the capturing candidate direction and the given capturing direction.

(Supplementary Note 13)
The photographing guide device according to supplementary note 12, wherein
the detection means estimates a geometric transformation matrix of the candidate three-dimensional shape and the registered three-dimensional shape, and detects the directional difference on a basis of the geometric transformation matrix.

(Supplementary Note 14)

The photographing guide device according to any of supplementary notes 11 to 13, wherein
the detection means estimates a geometric transformation matrix of the candidate three-dimensional shape and the registered three-dimensional shape, and detects the positional difference on a basis of the geometric transformation matrix.

(Supplementary Note 15)

The photographing guide device according to any of supplementary notes 11 to 14, wherein
the detection means estimates a geometric transformation matrix of the candidate three-dimensional shape and the registered three-dimensional shape, transforms the registered three-dimensional shape on a basis of the geometric transformation matrix, and generates a synthetic image in which the registered three-dimensional shape after being transformed and the candidate three-dimensional shape are synthesized.

(Supplementary Note 16)

A photographing guide method comprising:
comparing a candidate image of a structure captured from a capturing candidate position in a capturing candidate direction with a registered image of the structure captured from a given capturing position in a given capturing direction and stored in advance, thereby detecting a positional difference between the capturing candidate position and the given capturing position; and
outputting information indicating the positional difference detected.

(Supplementary Note 17)

A program for causing a computer to execute processing of:
comparing a candidate image of a structure captured from a capturing candidate position in a capturing candidate direction with a registered image of the structure captured from a given capturing position in a given capturing direction and stored in advance, thereby detecting a positional difference between the capturing candidate position and the given capturing position; and
outputting information indicating the positional difference detected.

REFERENCE SIGNS LIST

100 diagnosis device
110 computer
111 camera I/F unit
112 communication I/F unit
113 operation input unit
114 screen display unit
115 voice output unit
116 storage unit
117 arithmetic processing unit
120 cable
130 camera
140 structure
141 partial area
150 tripod
151 platform

What is claimed is:

1. A photographing guide device comprising:
a memory storing program instructions; and
a processor coupled to the memory, wherein the processor is configured to execute the program instructions to:
extract a plurality of feature points from each of a candidate image of a structure captured from a capturing candidate position in a capturing candidate direction and a registered image of the structure captured from a given capturing position in a given capturing direction stored in advance;
associate each feature point extracted from the candidate image with a corresponding feature point extracted from the registered image, as a feature point pair, resulting in obtaining a plurality of feature point pairs;
when at least a predetermined number of the plurality of feature point pairs have been obtained, estimate a homography matrix of the candidate image and the registered image based on the plurality of feature point pairs;
detect a positional difference between the capturing candidate position and the given capturing position, and a direction difference between the capturing candidate direction and the given capturing direction, on a basis of the homography matrix; and
output information indicating the positional difference and the direction difference that have been detected, and indicating a synthetic image, wherein
detection of the positional difference includes transformation of the registered image on the basis of the homography matrix, and generation of the synthetic image in which the registered image after transformation and the candidate image are synthesized.

2. The photographing guide device according to claim 1, wherein
detection of the positional difference includes generation of a crack image in which a crack on the structure is emphasized from the candidate image, and comparison of the generated crack image with a registered crack image that is generated from the registered image and stored in advance.

3. The photographing guide device according to claim 2, wherein
detection of the positional difference includes estimation of a homography matrix of the crack image and the registered crack image, and detection of the positional difference on a basis of the homography matrix of the crack image and the registered crack image.

4. The photographing guide device according to claim 2, wherein
detection of the positional difference includes estimation of a homography matrix of the crack image and the registered crack image, transformation of the registered crack image on a basis of the homography matrix of the crack image and the registered crack image, and generation of a synthetic image in which the registered crack image after transformation and the crack image are synthesized.

5. The photographing guide device according to claim 1, wherein
detection of the positional difference includes comparison of a candidate three-dimensional shape obtained by measuring a three-dimensional shape of a peripheral environment from the capturing candidate position with a registered three-dimensional shape obtained by measuring the three-dimensional shape of the peripheral environment from the given capturing position and stored in advance.

6. The photographing guide device according to claim 5, wherein
detection of the positional difference includes estimation of a geometric transformation matrix of the candidate three-dimensional shape and the registered three-dimensional shape, and detection of the positional difference on a basis of the geometric transformation matrix.

7. The photographing guide device according to claim 5, wherein detection of the positional difference includes estimation of a geometric transformation matrix of the candidate three-dimensional shape and the registered three-dimensional shape, transformation of the registered three-dimensional shape on a basis of the geometric transformation matrix, and generation of a synthetic image in which the registered three-dimensional shape after transformation and the candidate three-dimensional shape are synthesized.

8. A photographing guide method performed by a computer and comprising:

extracting a plurality of feature points from each of a candidate image of a structure captured from a capturing candidate position in a capturing candidate direction and a registered image of the structure captured from a given capturing position in a given capturing direction stored in advance;

associating each feature point extracted from the candidate image with a corresponding feature point extracted from the registered image, as a feature point pair, resulting in obtaining a plurality of feature point pairs;

when at least a predetermined number of the plurality of feature point pairs have been obtained, estimating a homography matrix of the candidate image and the registered image based on the plurality of feature point pairs;

detecting a positional difference between the capturing candidate position and the given capturing position, and a direction difference between the capturing candidate direction and the given capturing direction, on a basis of the homography matrix; and outputting information indicating the positional difference and the direction difference that have been detected, and indicating a synthetic image, wherein detection of the positional difference includes transformation of the registered image on the basis of the homography matrix, and generation of the synthetic image in which the registered image after transformation and the candidate image are synthesized.

9. A non-transitory computer-readable storage medium storing a program comprising instructions executable by a computer to perform processing comprising:

extracting a plurality of feature points from each of a candidate image of a structure captured from a capturing candidate position in a capturing candidate direction and a registered image of the structure captured from a given capturing position in a given capturing direction stored in advance;

associating each feature point extracted from the candidate image with a corresponding feature point extracted from the registered image, as a feature point pair, resulting in obtaining a plurality of feature point pairs;

when at least a predetermined number of the plurality of feature point pairs have been obtained, estimating a homography matrix of the candidate image and the registered image based on the plurality of feature point pairs;

detecting a positional difference between the capturing candidate position and the given capturing position, and a direction difference between the capturing candidate direction and the given capturing direction, on a basis of the homography matrix; and outputting information indicating the positional difference and the direction difference that have been detected, and indicating a synthetic image, wherein detection of the positional difference includes transformation of the registered image on the basis of the homography matrix, and generation of the synthetic image in which the registered image after transformation and the candidate image are synthesized.

* * * * *